(12) United States Patent
Hokuto et al.

(10) Patent No.: US 11,919,501 B2
(45) Date of Patent: Mar. 5, 2024

(54) BRAKE DEVICE FOR VEHICLE

(71) Applicant: DENSO CORPORATION, Kariya (JP)

(72) Inventors: Daisuke Hokuto, Kariya (JP); Etsugou Yanagida, Kariya (JP); Kunio Nanba, Kariya (JP)

(73) Assignee: DENSO CORPORATION, Kariya (JP)

( * ) Notice: Subject to any disclaimer, the term of this patent is extended or adjusted under 35 U.S.C. 154(b) by 79 days.

(21) Appl. No.: 17/836,335

(22) Filed: Jun. 9, 2022

(65) Prior Publication Data

US 2022/0297650 A1    Sep. 22, 2022

Related U.S. Application Data

(63) Continuation of application No. PCT/JP2020/046370, filed on Dec. 11, 2020.

(30) Foreign Application Priority Data

Dec. 13, 2019    (JP) ................. 2019-225658

(51) Int. Cl.
*B60T 8/40*    (2006.01)
*B60T 7/04*    (2006.01)

(52) U.S. Cl.
CPC ............ *B60T 8/4086* (2013.01); *B60T 7/042* (2013.01); *B60T 2220/04* (2013.01); *B60T 2270/82* (2013.01)

(58) Field of Classification Search
None
See application file for complete search history.

(56) References Cited

U.S. PATENT DOCUMENTS

| | | | | |
|---|---|---|---|---|
| 4,667,476 A | * | 5/1987 | Takata | ................. B60T 13/686 60/552 |
| 6,070,490 A | | 6/2000 | Aschoff et al. | |
| 2015/0285273 A1 | * | 10/2015 | Isono | ..................... B60T 11/16 60/533 |

FOREIGN PATENT DOCUMENTS

| | | | | |
|---|---|---|---|---|
| CN | 104249722 A | * | 12/2014 | ............... B60T 1/10 |
| JP | S55-032271 | | 3/1980 | |
| JP | S58-041692 | | 3/1983 | |
| JP | 2001-239925 | | 9/2001 | |
| JP | 2002-104153 | | 4/2002 | |
| JP | 2006-256614 | | 9/2006 | |
| JP | 2012-098848 | | 5/2012 | |
| JP | 2015-10613 | | 1/2015 | |
| JP | 2016-43789 | | 4/2016 | |

\* cited by examiner

*Primary Examiner* — Vicky A Johnson
(74) *Attorney, Agent, or Firm* — Nixon & Vanderhye P.C.

(57) ABSTRACT

A brake device for a vehicle includes: a brake pedal having a pedal part and a lever part that rotates about a rotation shaft when the pedal part is operated; a housing that rotatably supports the lever part; a reaction force generator connected to the housing and the lever part to generate a reaction force against the lever part according to a stroke amount of the brake pedal; and a stopper configured to stop the lever part by being in contact with the lever part such that the lever part is restricted from rotating in a direction opposite to a rotation direction when the pedal part is operated.

11 Claims, 38 Drawing Sheets

BRAKE DEVICE FOR VEHICLE

CROSS REFERENCE TO RELATED APPLICATION

The present application is a continuation application of International Patent Application No. PCT/JP2020/046370 filed on Dec. 11, 2020, which designated the U.S. and claims the benefit of priority from Japanese Patent Application No. 2019-225658 filed on Dec. 13, 2019. The entire disclosures of all of the above applications are incorporated herein by reference.

TECHNICAL FIELD

The present disclosure relates to a brake device for a vehicle.

BACKGROUND ART

A brake device is known, which includes a brake pedal and a spring that connects the brake pedal to a vehicle body.

SUMMARY

According to an aspect of the present disclosure, a brake device includes: a brake pedal having a pedal part and a lever part that rotates about a rotation shaft when the pedal part is operated; a housing that rotatably supports the lever part; a reaction force generator connected to the housing and the lever part to generate a reaction force against the lever part according to a stroke amount of the brake pedal; and a stopper configured to stop the lever part by being in contact with the lever part such that the lever part is restricted from rotating in a direction opposite to a rotation direction when the pedal part is operated.

BRIEF DESCRIPTION OF DRAWINGS

FIG. 7 is a cross-sectional view of the vehicle brake device when a brake pedal is stepped on.

DESCRIPTION OF EMBODIMENTS

Figure 1:
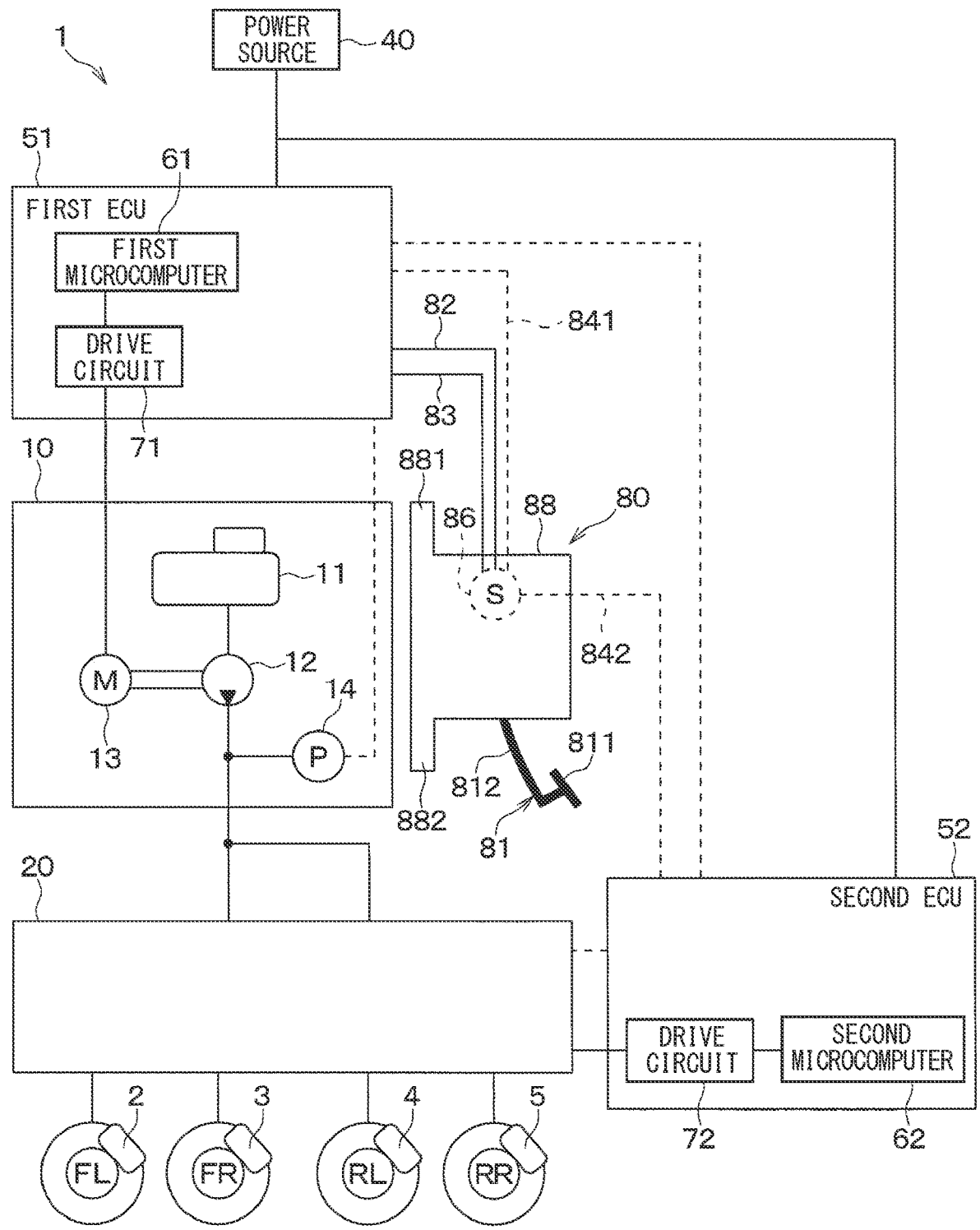
FIG. 1 is a configuration diagram of a vehicle brake system according to a first embodiment.

To begin with, examples of relevant techniques will be described.

Conventionally, a vehicular brake device is known, which includes a brake pedal and a spring that connects the brake pedal to a vehicle body.

According to the study by the inventors, if there is no reference for the attachment position of the spring, when the spring is attached to the brake pedal and the vehicle body, the position of the spring is easily varied. When the brake pedal is pressed down by the driver of the vehicle, the reaction force from the spring to the brake pedal easily changes, so that the accuracy of the reaction force is lowered. The present disclosure provides a brake device for a vehicle, so as to improve the accuracy of the reaction force relative to the brake pedal.

According to an aspect of the present disclosure, a brake device includes: a brake pedal having a pedal part and a lever part that rotates about a rotation shaft when the pedal part is operated; a housing that rotatably supports the lever part; a reaction force generator connected to the housing and the lever part to generate a reaction force against the lever part according to a stroke amount of the brake pedal; and a stopper configured to stop the lever part by being in contact with the lever part such that the lever part is restricted from rotating in a direction opposite to a rotation direction when the pedal part is operated.

Thus, the accuracy of the reaction force can be improved since a reference for the position of the brake pedal can be set.

The reference numerals attached to the components and the like indicate an example of correspondence between the components and the like and specific components and the like described in embodiments to be described below.

Hereinafter, embodiments will be described with reference to the drawings. In the following embodiments, the same or equivalent parts are denoted by the same reference numerals, and the description thereof will be omitted.

First Embodiment

A vehicle brake device 80 of a first embodiment is used in a vehicle brake system 1 that controls a left front wheel FL, a right front wheel FR, a left rear wheel RL, and a right rear wheel RR, which are wheels of a vehicle 6. First, a vehicle brake system 1 will be described.

As illustrated in FIG. 1, the vehicle brake system 1 includes a left front wheel cylinder, a right front wheel cylinder, a left rear wheel cylinder, and a right rear wheel cylinder. The vehicle brake system 1 includes a first actuator 10, a power source 40, a first ECU 51, a second actuator 20, a second ECU 52, and a vehicle brake device 80. Hereinafter, the wheel cylinder is referred to as W/C for convenience. The ECU is an abbreviation for Electronic Control Unit.

The left front W/C 2 is disposed on the left front wheel FL. The right front W/C 3 is disposed on the right front wheel FR. The left rear W/C 4 is disposed on the left rear wheel RL. The right rear W/C 5 is disposed on the right rear wheel RR. The left front W/C 2, the right front W/C 3, the left rear W/C 4, and the right rear W/C 5 are connected to respective brake pads, which are not illustrated, of the vehicle 6.

The first actuator 10 generates a brake fluid pressure. The first actuator 10 increases the brake fluid pressure to increase a brake fluid pressure of each of the left front W/C 2, the right front W/C 3, the left rear W/C 4, and the right rear W/C 5. Specifically, the first actuator 10 has a reservoir 11, a first pump 12, a first actuator motor 13, and a first pressure sensor 14.

The reservoir 11 stores a brake fluid such as oil, and meanwhile supplies the brake fluid to the first pump 12.

The first pump 12 is driven by the first actuator motor 13. Consequently, the first pump 12 increases the pressure of the brake fluid from the reservoir 11. The brake fluid with the increased fluid pressure flows from the first actuator 10 to the second actuator 20.

The first pressure sensor 14 outputs a signal corresponding to the fluid pressure of the brake fluid flowing to the second actuator 20 to the first ECU 51 to be described later.

The power source 40 supplies power to the first ECU 51 and the second ECU 52.

The first ECU 51 controls the first actuator 10 by controlling the first actuator motor 13. Specifically, the first ECU 51 has a first microcomputer 61 and a first drive circuit 71.

The first microcomputer 61 includes a CPU, a nonvolatile memory such as a ROM and a flash memory, a volatile memory such as a RAM, and an interface for communicating with the second microcomputer 62, a sensor, and the like, and controls the first drive circuit 71. Thus, the first microcomputer 61 controls the first actuator 10. The nonvolatile memory and the volatile memory are both non-transitory tangible storage media.

The first drive circuit 71 includes, for example, a switching element and the like, and supplies power to the first actuator motor 13 on the basis of a signal from the first microcomputer 61, to thereby drive the first actuator 10.

Figure 2:
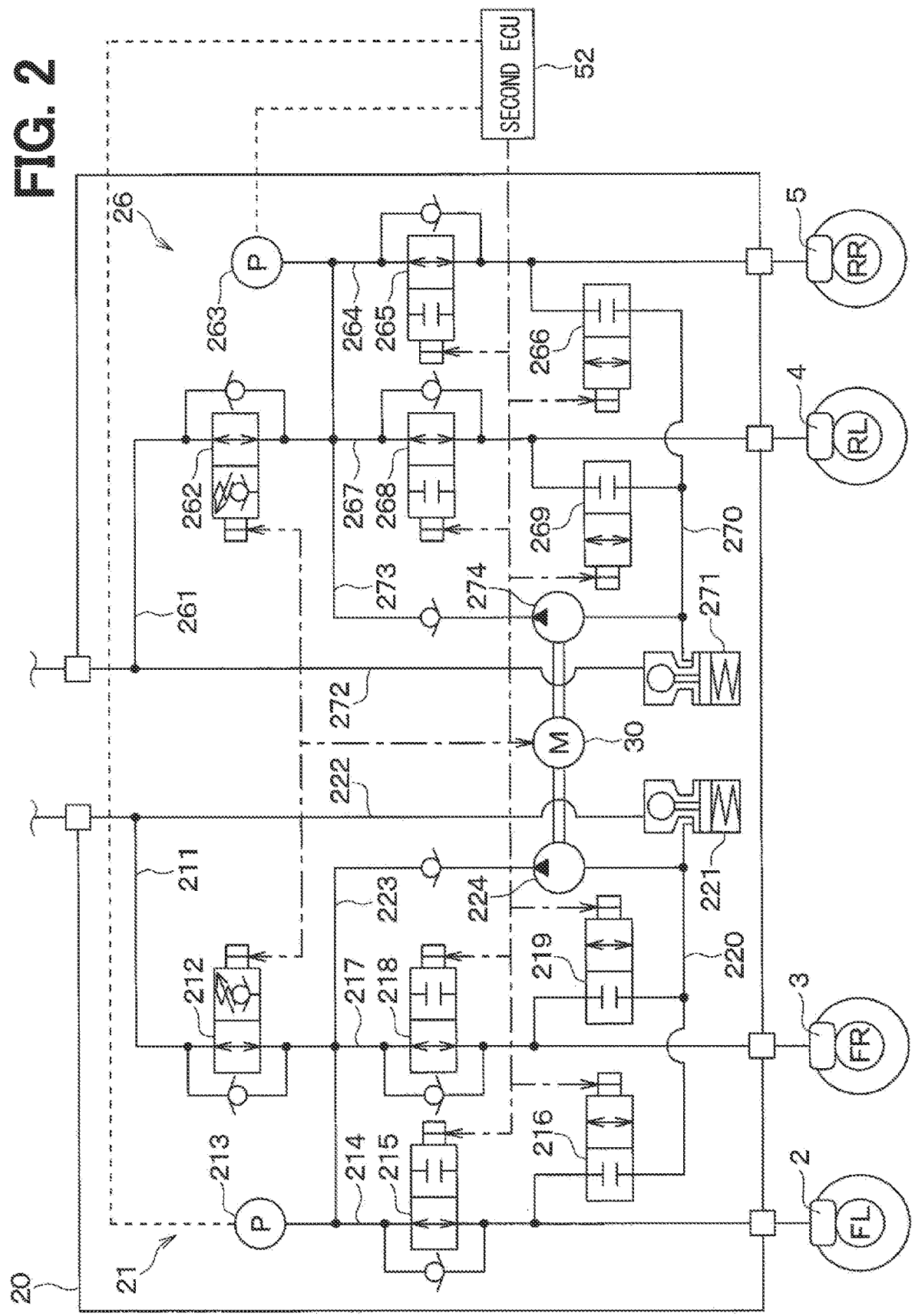
FIG. 2 is a configuration diagram of a second actuator.

The second actuator 20 corresponds to a second fluid pressure generation unit and generates a brake fluid pressure. The second actuator 20 controls the brake fluid pressure of each of the left front W/C 2, the right front W/C 3, the left rear W/C 4, and the right rear W/C 5 on the basis of a signal from the second ECU 52 to be described later. For example, as illustrated in FIG. 2, the second actuator 20 has a first piping system 21, a second piping system 26, and a second actuator motor 30.

The first piping system 21 controls the brake fluid pressures of the left front W/C 2 and the right front W/C 3. Specifically, the first piping system 21 includes a first main pipe 211, a first differential pressure control valve 212, a second pressure sensor 213, a first branch pipe 214, a first pressure-increasing control valve 215, and a first pressure-reducing control valve 216. The first piping system 21 also includes a second branch pipe 217, a second pressure-increasing control valve 218, a second pressure-reducing control valve 219, a first pressure reducing pipe 220, a first pressure regulating reservoir 221, a first auxiliary pipe 222, a first reflux pipe 223, and a second pump 224.

The first main pipe 211 is connected to the first actuator 10, and transmits the brake fluid pressure from the first actuator 10 to the first differential pressure control valve 212.

The first differential pressure control valve 212 controls a differential pressure between an upstream side and a downstream side of the first main pipe 211 by a signal from the second ECU 52 to be described later. For example, when the brake fluid pressures on the left front W/C 2 and the right front W/C 3 are higher than the brake fluid pressure on the first actuator 10 by a predetermined pressure or more, the first differential pressure control valve 212 allows flow of the brake fluid from the left front W/C 2 and the right front W/C 3 to the first actuator 10. Thus, the brake fluid pressures on the left front W/C 2 and the right front W/C 3 are maintained so as not to be higher than the brake fluid pressure on the first actuator 10 by a predetermined pressure or more.

The second pressure sensor 213 outputs a signal corresponding to the brake fluid pressure on a downstream side of the first differential pressure control valve 212 to the second ECU 52 to be described later.

The first branch pipe 214 guides a brake fluid from the first differential pressure control valve 212 to the first pressure-increasing control valve 215.

The first pressure-increasing control valve 215 is a normally open two-position electromagnetic valve capable of controlling a communicating state and a cutoff state. Specifically, when a solenoid coil, which is not illustrated, of the first pressure-increasing control valve 215 is in a non-energized state, the first pressure-increasing control valve 215 is in a communicating state to allow flow of the brake fluid to the left front W/C 2 and the first pressure-reducing control valve 216. When the solenoid coil, which is not illustrated, of the first pressure-increasing control valve 215 is in an energized state, the first pressure-increasing control valve 215 is in a cutoff state to cut off the flow of the brake fluid to the left front W/C 2 and the first pressure-reducing control valve 216.

The first pressure-reducing control valve 216 is a normally closed two-position electromagnetic valve capable of controlling a cutoff state and a communicating state. Specifically, when a solenoid coil, which is not illustrated, of the first pressure-reducing control valve 216 is in a non-energized state, the first pressure-reducing control valve 216 is in a cutoff state to cut off flow of the brake fluid to the first pressure reducing pipe 220 to be described later. When the solenoid coil, which is not illustrated, of the first pressure-reducing control valve 216 is in an energized state, the first pressure-reducing control valve 216 is in a communicating state to allow the flow of the brake fluid to the first pressure reducing pipe 220 to be described later.

The second branch pipe 217 guides the brake fluid from the first differential pressure control valve 212 to the second pressure-increasing control valve 218.

As is the first pressure-increasing control valve 215, the second pressure-increasing control valve 218 is a normally open two-position electromagnetic valve. Specifically, when a solenoid coil, which is not illustrated, of the second pressure-increasing control valve 218 is in a non-energized state, the second pressure-increasing control valve 218 is in a communicating state to allow flow of the brake fluid to the right front W/C 3 and the second pressure-reducing control valve 219. When the solenoid coil, which is not illustrated, of the second pressure-increasing control valve 218 is in an energized state, the second pressure-increasing control valve 218 is in a cutoff state to cut off the flow of the brake fluid to the right front W/C 3 and the second pressure-reducing control valve 219.

As is the first pressure-reducing control valve 216, the second pressure-reducing control valve 219 is a normally closed two-position electromagnetic valve. Specifically, when a solenoid coil, which is not illustrated, of the second pressure-reducing control valve 219 is in a non-energized state, the second pressure-reducing control valve 219 is in a cutoff state to cut off flow of the brake fluid to the first pressure reducing pipe 220 to be described later. When the solenoid coil, which is not illustrated, of the second pressure-reducing control valve 219 is in an energized state, the second pressure-reducing control valve 219 is in a communicating state to allow the flow of the brake fluid to the first pressure reducing pipe 220 to be described later.

The first pressure reducing pipe 220 guides the brake fluid from the first pressure-reducing control valve 216 and the second pressure-reducing control valve 219 to the first pressure regulating reservoir 221.

The first auxiliary pipe 222 branches from the first main pipe 211 and guides the brake fluid from the first actuator 10 to the first pressure regulating reservoir 221.

The first pressure regulating reservoir 221 stores the brake fluid flowing from the first pressure-reducing control valve 216 and the second pressure-reducing control valve 219 via the first pressure reducing pipe 220. The first pressure regulating reservoir 221 stores the brake fluid flowing from the first actuator 10 via the first auxiliary pipe 222. Moreover, when the brake fluid is sucked by the second pump 224 to be described later, the first pressure regulating reservoir 221 adjusts a flow rate of the stored brake fluid.

The first reflux pipe 223 is connected between the first differential pressure control valve 212 and the first pressure-increasing control valve 215 and the second pressure-increasing control valve 218. The first reflux pipe 223 is connected to the second pump 224.

The second pump 224 is connected to the first pressure reducing pipe 220 and is driven by a second actuator motor 30 corresponding to a second motor. Thus, the second pump 224 sucks the brake fluid stored in the first pressure regulating reservoir 221. The sucked brake fluid flows between the first differential pressure control valve 212 and the first pressure-increasing control valve 215 and the second pressure-increasing control valve 218 via the first reflux pipe 223. Thus, the brake fluid pressure of each of the left front W/C 2 and the right front W/C 3 increases.

The second piping system 26 controls the brake fluid pressures of the left rear W/C 4 and the right rear W/C 5. Specifically, the second piping system 26 includes a second main pipe 261, a second differential pressure control valve 262, a third pressure sensor 263, a third branch pipe 264, a third pressure-increasing control valve 265, and a third pressure-reducing control valve 266. The second piping system 26 also includes a fourth branch pipe 267, a fourth pressure-increasing control valve 268, a fourth pressure-reducing control valve 269, a second pressure reducing pipe 270, a second pressure regulating reservoir 271, a second auxiliary pipe 272, a second reflux pipe 273, and a third pump 274.

Here, the second piping system 26 is configured similarly to the first piping system 21. Therefore, the left front W/C 2 described above is replaced with the right rear W/C 5. The right front W/C 3 described above is replaced with the left rear W/C 4. Moreover, the second main pipe 261 corresponds to the first main pipe 211. The second differential pressure control valve 262 corresponds to the first differential pressure control valve 212. The third pressure sensor 263 corresponds to the second pressure sensor 213. The third branch pipe 264 corresponds to the first branch pipe 214. The third pressure-increasing control valve 265 corresponds to the first pressure-increasing control valve 215. The third pressure-reducing control valve 266 corresponds to the first pressure-reducing control valve 216. The fourth branch pipe 267 corresponds to the second branch pipe 217. The fourth pressure-increasing control valve 268 corresponds to the second pressure-increasing control valve 218. The fourth pressure-reducing control valve 269 corresponds to the second pressure-reducing control valve 219. The second pressure reducing pipe 270 corresponds to the first pressure reducing pipe 220. The second pressure regulating reservoir 271 corresponds to the first pressure regulating reservoir 221. The second auxiliary pipe 272 corresponds to the first auxiliary pipe 222. The second reflux pipe 273 corresponds to the first reflux pipe 223. The third pump 274 corresponds to the second pump 224.

The second ECU 52 controls the second actuator 20 by controlling the valves of the second actuator 20, the second actuator motor 30, and the like. Specifically, the second ECU 52 has a second microcomputer 62 and a second drive circuit 72.

The second microcomputer 62 includes a CPU, a non-volatile memory such as a ROM and a flash memory, a volatile memory such as a RAM, and an interface for communicating with the first microcomputer 61, a sensor, and the like, and controls the second drive circuit 72. The second microcomputer 62 thus controls the second actuator 20. The nonvolatile memory and the volatile memory are both non-transitory tangible storage media.

The second drive circuit 72 includes, for example, a switching element and the like, and supplies power to each valve of the second actuator 20 and the second actuator motor 30 on the basis of a signal from the second microcomputer 62, to thereby drive the second actuator 20.

Figure 3:
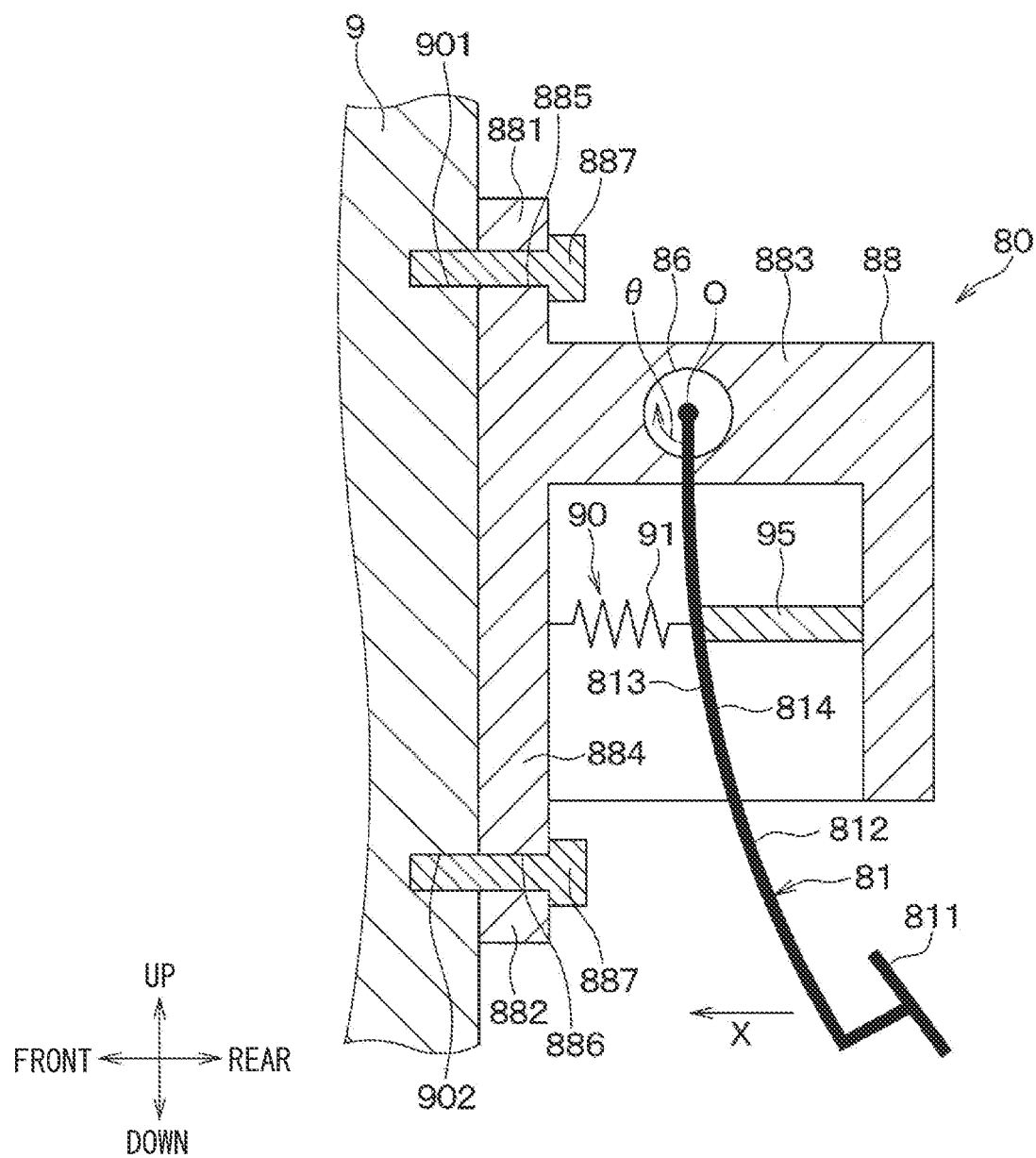
FIG. 3 is a cross-sectional view of a vehicle brake device.

As illustrated in FIGS. 1 and 3, the vehicle brake device 80 includes a brake pedal 81, a sensor power source wire 82, a sensor ground wire 83, a first sensor output wire 841, and a second sensor output wire 842. The vehicle brake device 80 includes a stroke sensor 86, a housing 88, a reaction force generator 90, and a stopper 95.

The brake pedal 81 is operated by being stepped on by a driver of the vehicle 6. Specifically, the brake pedal 81 has a pedal part 811 and a lever part 812. The pedal part 811 is stepped on by the driver of the vehicle 6. The lever part 812 is connected to the pedal part 811, and rotates about the rotation shaft O when the pedal part 811 is stepped on by the driver of the vehicle 6.

As illustrated in FIG. 1, the sensor power source wire 82 is connected to the first ECU 51 and the stroke sensor 86 to be described later. Thus, power from the power source 40 is supplied to the stroke sensor 86 via the first ECU 51 and the sensor power source wire 82. The sensor power source wire 82 may be connected to the second ECU 52 and the stroke sensor 86 to be described later. Thus, the power from the power source 40 is supplied to the stroke sensor 86 via the second ECU 52 and the sensor power source wire 82.

The sensor ground wire 83 is connected to the first ECU 51 and the stroke sensor 86 to be described later. The sensor ground wire 83 may be connected to the second ECU 52 and the stroke sensor 86 to be described later.

The first sensor output wire 841 is connected to the first ECU 51 and the stroke sensor 86.

The second sensor output wire 842 is connected to the second ECU 52 and the stroke sensor 86.

Figure 4:
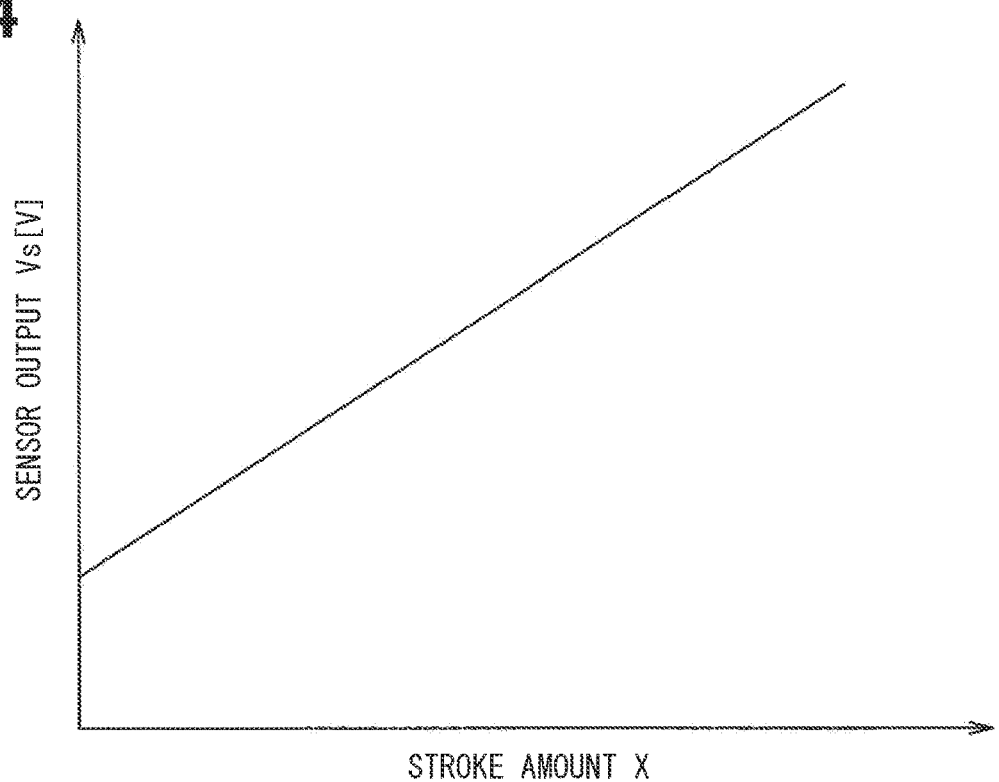
FIG. 4 is a relationship diagram between a stroke amount and a sensor output.

As illustrated in FIG. 3, the stroke sensor 86 is disposed, for example, next to the rotation shaft O of the lever part 812. As illustrated in FIGS. 1 and 4, the stroke sensor 86 outputs a signal corresponding to a stroke amount X, which is an operation amount of the brake pedal 81 by a depression force of the driver of the vehicle 6, to the first ECU 51 via the first sensor output wire 841. Moreover, the stroke sensor 86 outputs the signal corresponding to the stroke amount X of the brake pedal 81 to the second ECU 52 via the second sensor output wire 842. Here, the stroke amount X is, for example, a translational movement amount of the pedal part 811 toward the front of the vehicle 6. Moreover, as illustrated in FIG. 4, the stroke amount X and a sensor output Vs of the stroke sensor 86 are adjusted so as to have a linear relationship. Here, the sensor output Vs is displayed by, for example, a voltage. The stroke sensor 86 may output a signal corresponding to a rotation angle θ about the rotation shaft O of the lever part 812 to the first ECU 51 via the first sensor output wire 841. Moreover, the stroke sensor 86 may output the signal corresponding to the rotation angle θ of the brake pedal 81 to the second ECU 52 via the second sensor output wire 842. The rotation angle θ and the signal of the stroke sensor 86 are adjusted to have a linear relationship, as is the relationship between the stroke amount X and the sensor output Vs.

Figure 5:
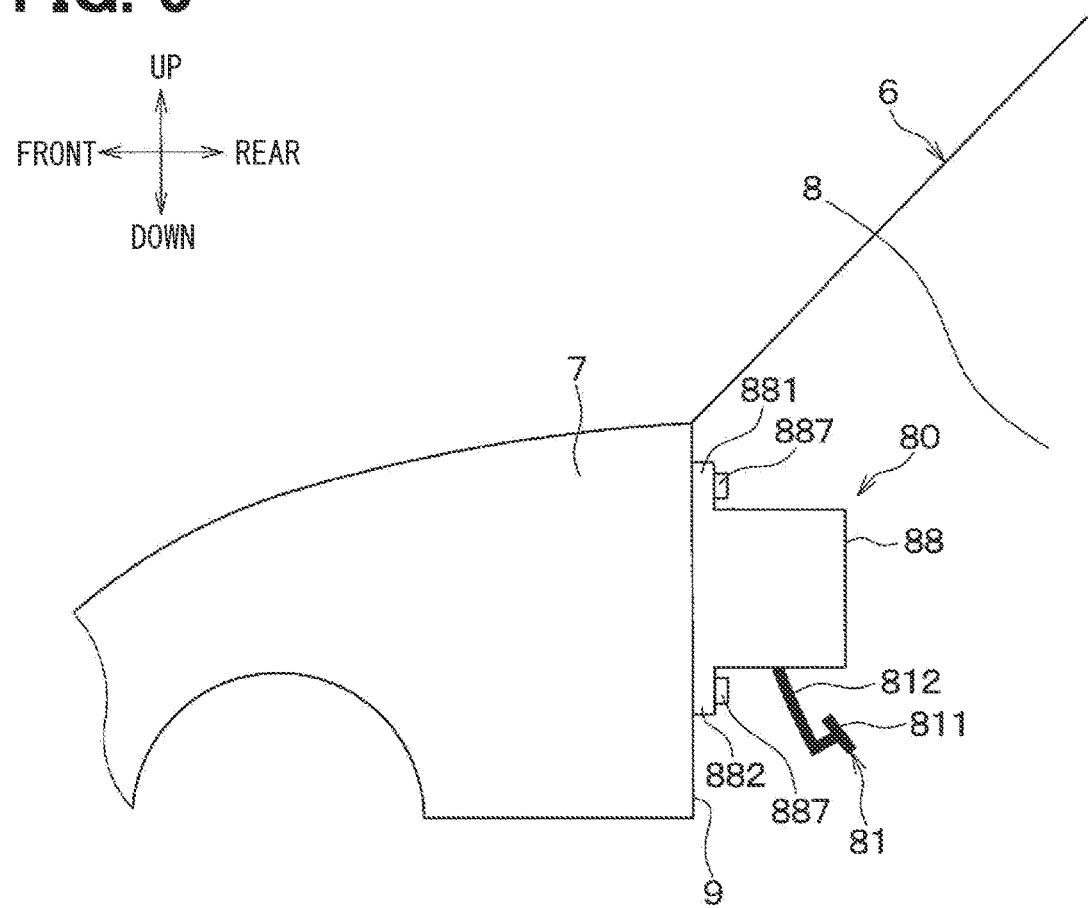
FIG. 5 is a view when the vehicle brake device is attached to a vehicle.

As illustrated in FIGS. 3 and 5, the housing 88 is attached to a dash panel 9 that is a partition wall that separates a cabin outer side 7 such as the engine room from a cabin 8 of the vehicle 6. The dash panel 9 may be referred to as a bulkhead. In the cabin outer side 7, not only the engine of the vehicle 6 but also a battery, an air conditioner, and the like of the vehicle 6 are disposed.

As illustrated in FIG. 3, the housing 88 is formed in a bottomed cylindrical shape, and has a first mounting portion 881, a second mounting portion 882, a housing bottom portion 883, and a housing cylindrical portion 884. Here, for the sake of description, an upper side with respect to the front of the vehicle 6 will be simply referred to as an upper side for convenience. A lower side with respect to the front of the vehicle 6 will be simply referred to as a lower side.

The first mounting portion 881 is connected to the housing bottom portion 883 to be described later and extends upward from the housing bottom portion 883. The first mounting portion 881 includes a first mounting hole 885. By inserting a bolt 887 into the first mounting hole 885 and a first hole 901 of the dash panel 9, the first mounting portion 881 is mounted to the dash panel 9. Here, the bolt 887 is inserted so as not to penetrate the dash panel 9.

The second mounting portion 882 is connected to the housing cylindrical portion 884 to be described later and extends downward from the housing cylindrical portion 884. The second mounting portion 882 includes a second mounting hole 886. By inserting a bolt 887 into the second mounting hole 886 and a second hole 902 of the dash panel 9, the second mounting portion 882 is mounted to the dash panel 9.

The housing bottom portion 883 supports a portion of the lever part 812 such that the lever part 812 is rotatable about the rotation shaft O and supports the stroke sensor 86.

The housing cylindrical portion 884 has a cylindrical shape, is connected to the housing bottom portion 883, and extends downward from the housing bottom portion 883. The housing cylindrical portion 884 houses a portion of the lever part 812.

The reaction force generator 90 is connected to the housing cylindrical portion 884 and the lever part 812, and generates a reaction force Fr against the lever part 812 according to the stroke amount X. Specifically, the reaction force generator 90 has an elastic member 91.

Figure 6:
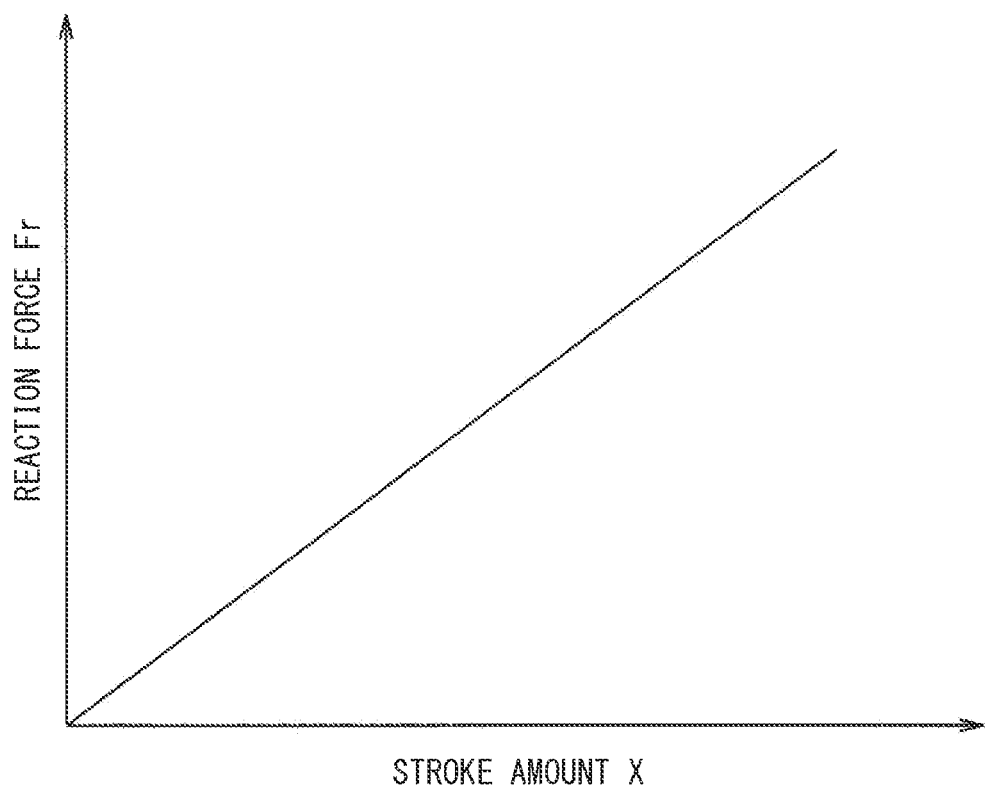
FIG. 6 is a relationship diagram between a stroke amount and a reaction force.

The elastic member 91 is, for example, an equal pitch spring. The elastic member 91 is connected to a front side of the housing cylindrical portion 884 and a front surface 813 of the lever part 812. Thus, when the brake pedal 81 is operated by a depression force of the driver of the vehicle 6, a force corresponding to the depression force is transmitted from the lever part 812 to the elastic member 91. Consequently, the elastic member 91 is elastically deformed, here contracted, and thus a restoring force is generated. The reaction force Fr against the lever part 812 is generated by this restoring force. The restoring force of the elastic member 91 is proportional to a deformation amount of the elastic member 91. Moreover, the deformation amount of the elastic member 91 is proportional to the stroke amount X. Therefore, the restoring force of the elastic member 91 is proportional to the stroke amount X. Thus, the stroke amount X and the reaction force Fr have a linear relationship as illustrated in FIG. 6. The rotation angle θ is also adjusted to have a linear relationship with the reaction force Fr.

As illustrated in FIG. 3, the stopper 95 is connected to a rear side of the housing cylindrical portion 884. The stopper 95 is in contact with a rear surface 814 of the lever part 812. Moreover, the stopper 95 is formed by, for example, resin, metal, or the like, and an elastic modulus of the stopper 95 is much larger than an elastic modulus of the elastic member 91. Thus, the stopper 95 is hardly deformed by the force from the elastic member 91. When in contact with the lever part 812, the stopper 95 stops the lever part 812 so that the lever part 812 of the brake pedal 81 is inhibited from rotating in a direction opposite to a rotation direction when the pedal part 811 of the brake pedal 81 is stepped on. Moreover, here, the stopper 95 is located on a straight line passing through the elastic member 91 and along an extending and contracting direction of the elastic member 91 so as to easily stop the lever part 812.

The vehicle brake system 1 is configured as described above.

Next, an operation of the vehicle brake system 1 will be described.

Figure 7:
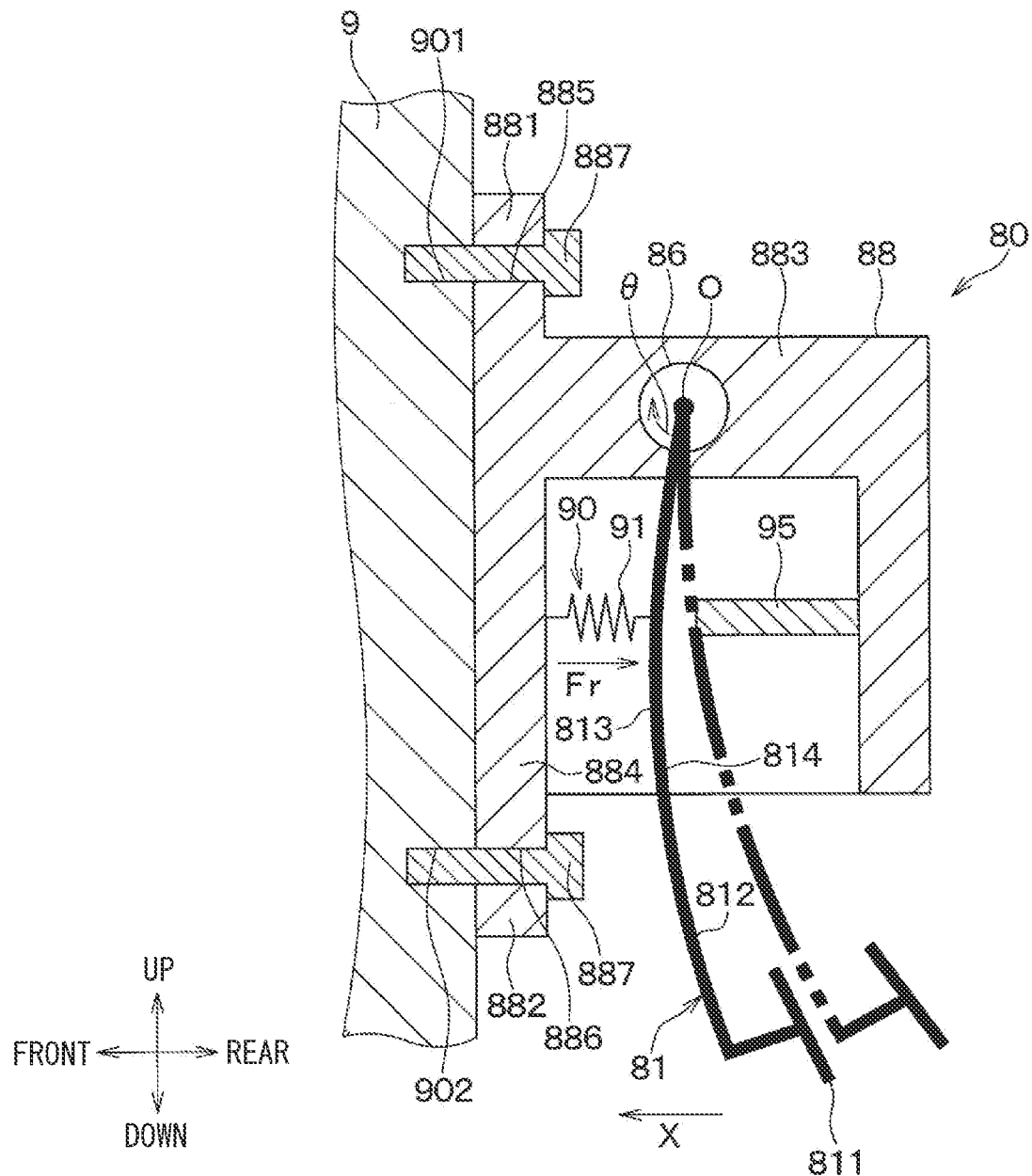

In an initial state, as illustrated in FIG. 3, the lever part 812 is stopped by the stopper 95. For example, as illustrated in FIG. 7, when the driver of the vehicle 6 steps on the pedal part 811, the lever part 812 rotates about the rotation shaft O. Consequently, the stroke amount X increases, and thus the sensor output Vs increases. At this time, in order to decelerate the vehicle 6, the first microcomputer 61 outputs a signal for driving the first actuator 10 to the first drive circuit 71 so that a first fluid pressure P1, which is the fluid pressure of the brake fluid flowing from the first actuator 10 to the second actuator 20, increases. The first drive circuit 71 drives the first actuator motor 13 on the basis of the signal from the first microcomputer 61. At this time, a rotation speed of the first actuator motor 13 increases. Consequently, the first pump 12 increases the pressure of the brake fluid from the reservoir 11. Thus, the first fluid pressure P1 increases. The brake fluid having a relatively large first fluid pressure P1 flows from the first actuator 10 to the second actuator 20.

When the stroke amount X increases, the elastic member 91 contracts because it is connected to the front side of the housing cylindrical portion 884 and the lever part 812. Consequently, the reaction force Fr accompanying the restoring force of the elastic member 91 is generated. Here, a deformation amount of the elastic member 91 is denoted by Xr. An elastic modulus of the elastic member 91 is denoted by Kr. At this time, the reaction force Fr is expressed by the following relational expression (1).

[Mathematical Expression 1]

$$Fr = Kr \times Xr \tag{1}$$

When the foot of the driver of the vehicle 6 is disengaged from the pedal part 811, the brake pedal 81 returns to the initial position by the reaction force Fr. In FIG. 7, the position of the brake pedal 81 in the initial state is indicated by a two-dot chain line. Here, the stroke amount X is a translational movement amount of the pedal part 811 toward the front of the vehicle 6, and thus the direction of the reaction force Fr is backward.

When the driver of the vehicle 6 steps on the pedal part 811, the second microcomputer 62 performs normal control, ABS control, VSC control, and the like.

For example, the second microcomputer 62 controls the second drive circuit 72 in order to decelerate the vehicle 6 in normal control that is brake control by operating the brake pedal 81 by the driver of the vehicle 6. Thus, the second drive circuit 72 brings the pressure-increasing control valve of the second actuator 20 into a communicating state by bringing a solenoid coil of the pressure-increasing control valve of the second actuator 20 into a non-energized state. Accordingly, the brake fluid flowing from the first actuator 10 to the second actuator 20 flows to the left front W/C 2, the right front W/C 3, the left rear W/C 4, and the right rear W/C 5 via the corresponding pressure-increasing control valve. Therefore, each brake pad, not illustrated, is in frictional contact with a brake disc corresponding thereto. The wheel corresponding to each brake disc is thereby decelerated, and thus the vehicle 6 decelerates. Consequently, the vehicle 6 stops.

The second microcomputer 62 calculates respective slip ratios of the left front wheel FL, the right front wheel FR, the left rear wheel RL, and the right rear wheel RR on the basis of the wheel speeds and the vehicle speed of the vehicle 6, for example. The second microcomputer 62 then determines whether or not to execute the ABS control on the basis of the slip ratios. When executing the ABS control, the second microcomputer 62 performs any of a pressure reducing mode, a holding mode, and a pressure increasing mode according to the slip ratios. In the pressure reducing mode, the pressure-increasing control valve corresponding to the control target wheel is brought into a cutoff state and the pressure-reducing control valve is brought into an appropriate communicating state, so that the pressure of the W/C corresponding to the control target wheel is reduced. In the holding mode, the pressure-increasing control valve and the pressure-reducing control valve corresponding to the control target wheel are brought into the cutoff state, so that the pressure of the W/C corresponding to the control target wheel is retained. Moreover, in the pressure increasing mode, the pressure-reducing control valve corresponding to the control target wheel is brought into a cutoff state and the pressure-increasing control valve is set to an appropriate communicating state, so that the pressure of the W/C corresponding to the control target wheel increases. In this manner, the slip rate of each wheel of the vehicle 6 is controlled, and thus the left front wheel FL, the right front wheel FR, the left rear wheel RL, and the right rear wheel RR are prevented from reaching locking.

The second microcomputer 62 calculates a sideslip state of the vehicle 6 on the basis of, for example, a yaw rate, a steering angle, an acceleration, respective wheel speeds, a vehicle speed, and the like. The second microcomputer 62 then determines whether or not to execute the VSC control on the basis of the sideslip state of the vehicle 6. When executing the VSC control, the second microcomputer 62 selects a control target wheel for stabilizing turning of the vehicle 6 on the basis of the sideslip state of the vehicle 6. Moreover, the second microcomputer 62 further controls the second drive circuit 72 so as to increase the pressure of the W/C corresponding to the selected control target wheel. At this time, the second drive circuit 72 drives the pump corresponding to the control target wheel by driving the second actuator motor 30. Thus, the pump corresponding to the control target wheel sucks the brake fluid stored in the pressure adjusting reservoir corresponding to the control target wheel. The sucked brake fluid flows to the W/C corresponding to the control target wheel via the reflux pipe corresponding to the control target wheel. Thus, the brake fluid pressure of the W/C corresponding to the control target wheel increases, so that the sideslip of the vehicle 6 is suppressed. Thus, traveling of the vehicle 6 is stabilized.

In this manner, the second microcomputer 62 thus performs the normal control, the ABS control, the VSC control, and the like. At this time, in addition to the normal control, the ABS control, and the VSC control described above, the second microcomputer 62 may perform collision avoidance control, regenerative cooperative control, and the like on the basis of a signal from another ECU that is not illustrated.

The vehicle brake system 1 operates as described above. In the vehicle brake device 80 provided in the vehicle brake system 1, accuracy of the reaction force Fr against the brake pedal 81 is improved. Hereinafter, improvement of the accuracy of the reaction force Fr will be described.

Figure 8:
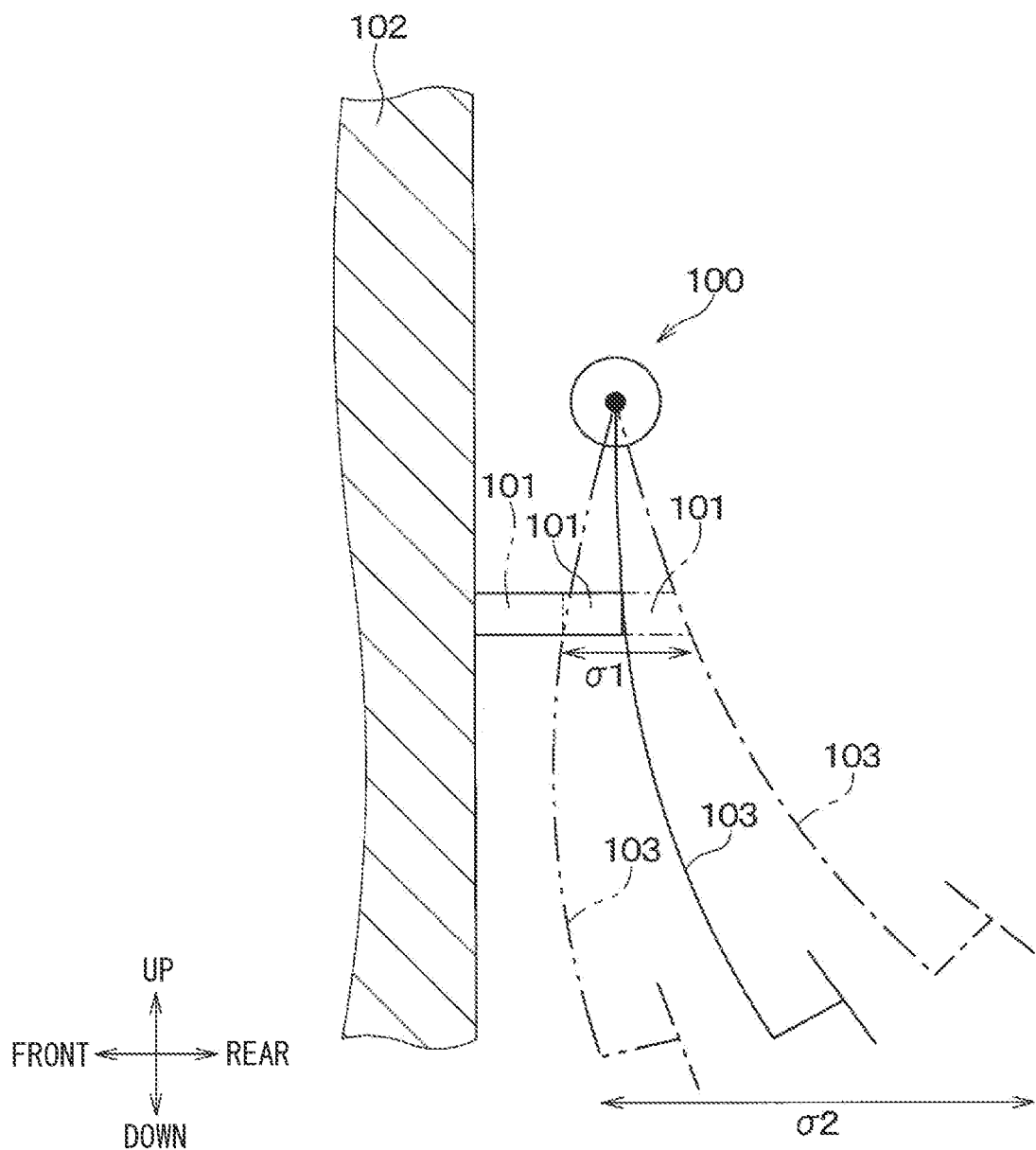
FIG. 8 is a cross-sectional view of a vehicle brake device of a comparative example.
Figure 9:
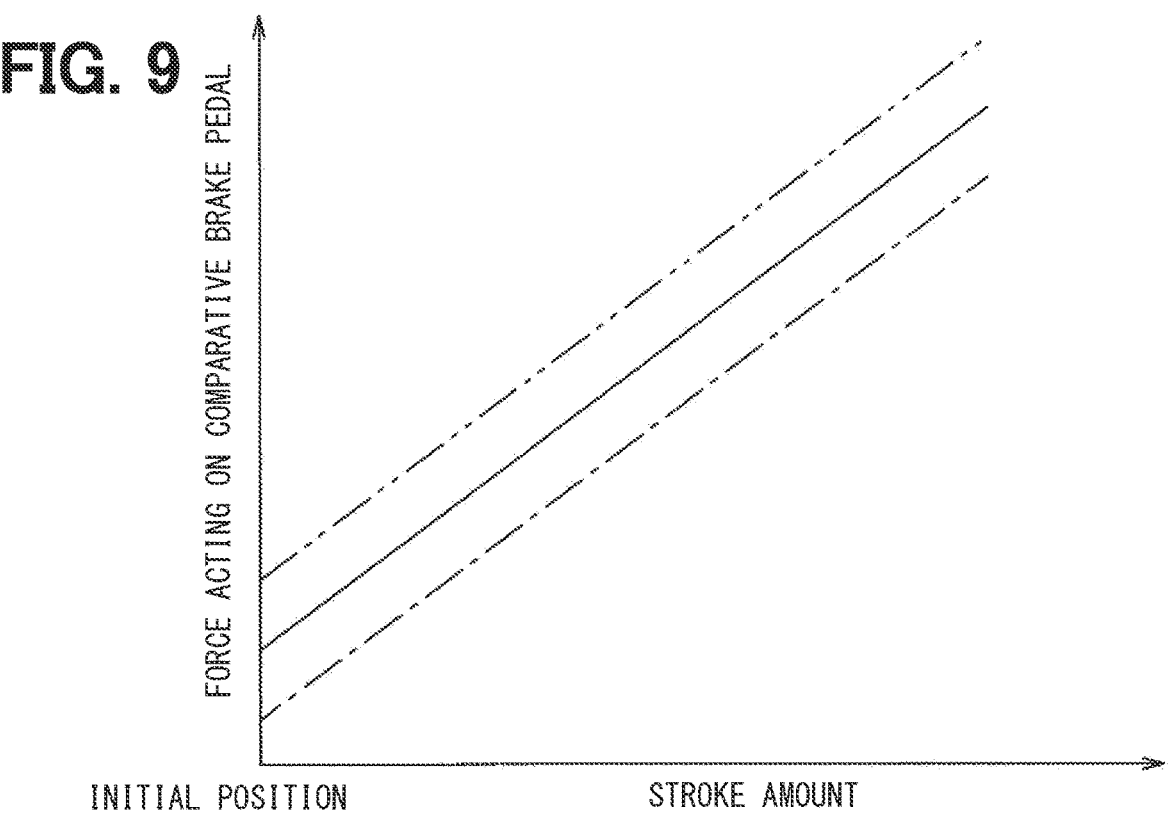
FIG. 9 is a relationship diagram between a stroke amount and an acting force in the comparative example.

For example, as in a comparative brake device 100 of a comparative example illustrated in FIG. 8, when a spring mechanism 101 is connected to the vehicle body 102 and the comparative brake pedal 103, there is no reference of the position of the spring mechanism 101, and thus a spring position variation σ1, which is a variation in the position of the spring mechanism 101, occurs. Thus, as illustrated in FIG. 9, the force acting on the comparative brake pedal 103 from the spring mechanism 101 in an initial state varies. For example, as indicated by a one-dot chain line in FIGS. 8 and 9, when the contraction amount of the spring mechanism 101 is relatively small, the force acting on the comparative brake pedal 103 becomes relatively small. As indicated by a two-dot chain line in FIGS. 8 and 9, when the contraction amount of the spring mechanism 101 is relatively large, the force acting on the comparative brake pedal 103 becomes relatively large.

Figure 10:
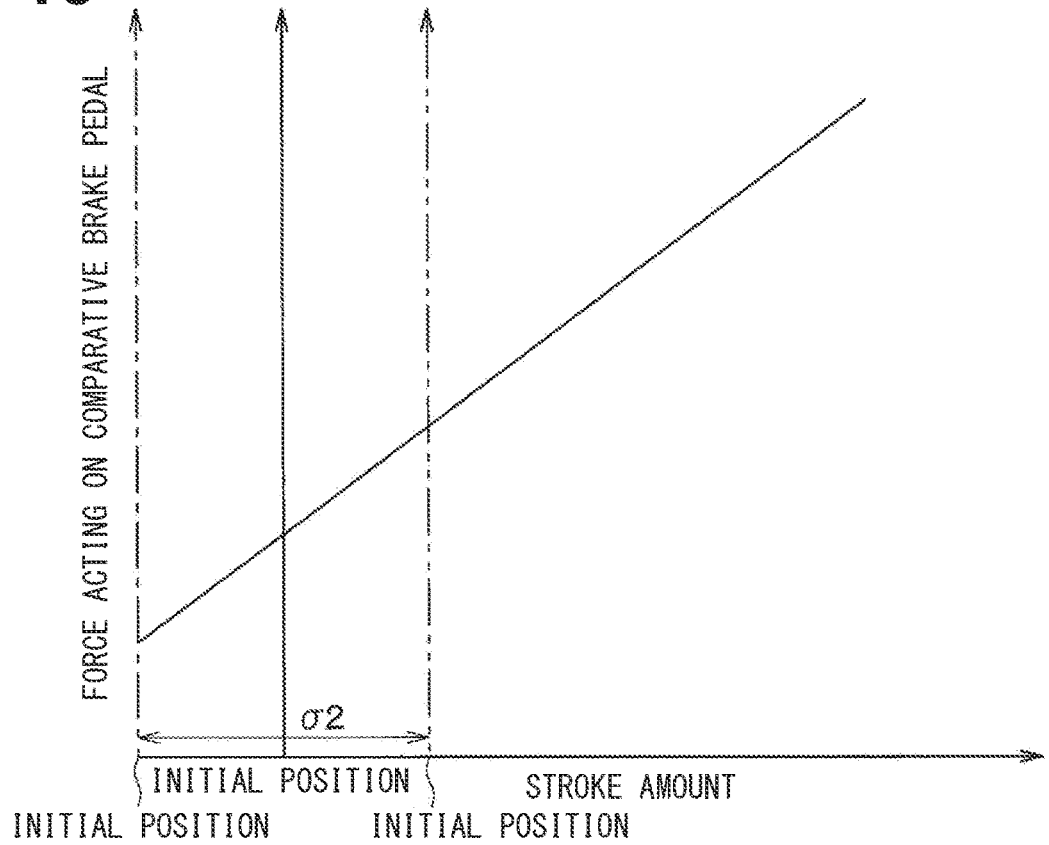
FIG. 10 is a relationship diagram between a stroke amount and an acting force in the comparative example.

As illustrated in FIG. 8, due to the spring position variation σ1, a pedal variation σ2 that varies with the initial position of the comparative brake pedal 103 occurs. Thus, as illustrated in FIG. 10, the force acting on the comparative brake pedal 103 from the spring mechanism 101 in the initial state varies. For example, as indicated by a one-dot chain line in FIGS. 8 and 10, when the comparative brake pedal 103 is relatively separated from the vehicle body 102, the force acting on the comparative brake pedal 103 becomes relatively small. As indicated by the two-dot chain line in FIGS. 8 and 10, when the comparative brake pedal 103 is relatively close to the vehicle body 102, the force acting on the comparative brake pedal 103 becomes relatively large.

As described above, in the comparative brake device 100, the force acting on the comparative brake pedal 103 from the spring mechanism 101 varies in the initial state. Thus, the reaction force from the spring mechanism 101 to the comparative brake pedal 103 when the comparative brake pedal 103 is stepped on easily varies. Therefore, in the comparative brake device 100, accuracy of this reaction force decreases.

In contrast, the vehicle brake device 80 of the present embodiment includes a stopper 95. When in contact with the lever part 812, the stopper 95 stops the lever part 812 so that the brake pedal 81 is inhibited from rotating in a direction opposite to a rotation direction when the brake pedal 81 is stepped on. Thus, the reference of the position of the brake pedal 81 is set. Accordingly, the reaction force generator 90 and the brake pedal 81 can be stably assembled, so that positional variations of the reaction force generator 90 and the brake pedal 81 can be reduced. Therefore, the accuracy of the reaction force Fr is improved. Since the accuracy of the reaction force Fr is improved, labor of adjusting the reaction force generator 90 and the brake pedal 81 is reduced. Thus, the number of adjustment steps of the reaction force generator 90 and the brake pedal 81 is reduced.

The vehicle brake device 80 also exhibits effects as described below.

[1] As described above, since the reference of the position of the brake pedal 81 is set, the reaction force generator 90 and the brake pedal 81 can be easily assembled.

[2] As illustrated in FIGS. 3 and 6, the elastic member 91 of the reaction force generator 90 is connected to the housing 88 and the lever part 812 of the brake pedal 81. The reaction force Fr against the lever part 812 is generated according to the stroke amount X of the brake pedal 81 by the elastic member 91 of the reaction force generator 90. The housing 88 is disposed on the cabin 8 side of the dash panel 9 that separates the cabin outer side 7 such as the engine room from the cabin 8 of the vehicle 6.

Since the housing 88 and the dash panel 9 are separate bodies, the housing 88, the reaction force generator 90, and the brake pedal 81 can be adjusted by the vehicle brake device 80 alone. This eliminates the need to adjust the housing 88, the reaction force generator 90, and the brake pedal 81 for each vehicle 6. Therefore, the housing 88, the reaction force generator 90, and the brake pedal 81 can be easily adjusted. Since the housing 88, the reaction force generator 90, and the brake pedal 81 can be easily adjusted, the accuracy of the reaction force Fr with respect to the stroke amount X can be improved.

[3] In the vehicle brake device 80, the housing 88 is disposed on the cabin 8 side of the dash panel 9 that separates the cabin outer side 7 and the cabin 8 of the vehicle 6. Thus, there is no need for connection to the master cylinder or the like in the engine room, so that the degree of flexibility of the mounting position of the vehicle brake device 80 becomes relatively high.

[4] In the vehicle brake device 80, the elastic member 91 of the reaction force generator 90 is connected to the housing 88 and the lever part 812 of the brake pedal 81. The reaction force Fr against the lever part 812 is generated according to the stroke amount X of the brake pedal 81 by the elastic member 91 of the reaction force generator 90. Thus, it is not necessary to dispose a flow path or the like of the brake fluid for generating the reaction force Fr, so that the number of parts of the brake device can be reduced.

[5] In the vehicle brake device 80, the reaction force generator 90 has the elastic member 91 that deforms according to the stroke amount X. The restoring force of the elastic member 91 is not affected by mixing of air or the like, and thus is less likely to be changed by mixing of air or the like. Therefore, the reaction force Fr by the elastic member 91 is less likely to be changed by mixing of air or the like as compared with the reaction force by the pressure of a viscous fluid such as oil, and thus drivability is improved in the vehicle brake device 80. In the vehicle brake device 80, the stroke amount X and the reaction force Fr have a linear relationship as illustrated in FIG. 6. Thus, an intention of the driver of the vehicle 6 is easily detected, and controllability of the reaction force Fr is improved.

[6] The housing 88 is disposed on the cabin 8 side of the dash panel 9 that separates the cabin outer side 7 such as the engine room of the vehicle 6 and the cabin 8. Moisture and oil from the engine room are less likely to enter the cabin 8, so that moisture and oil from the engine room are less likely to adhere to the elastic member 91 and the reaction force generator 90. External factors, for example, light and heat from the engine room are less likely to affect the cabin 8. Therefore, the elastic member 91 of the reaction force generator 90 is less likely to deteriorate, so that durability is improved.

[7] The stopper 95 is located on the straight line passing through the elastic member 91 and along the extending direction of the elastic member 91. Accordingly, a moment based on a force by the stopper 95 and the elastic member 91 is easily canceled, and thus the moment based on the force by the stopper 95 and the elastic member 91 is less likely to be generated in the brake pedal 81. Thus, backlash of the brake pedal 81 is suppressed, and the accuracy of the reaction force Fr is improved.

Second Embodiment

A second embodiment is different from the first embodiment in the form of the elastic member 91 of the reaction force generator 90. Other configurations are similar to those of the first embodiment.

Figure 11:
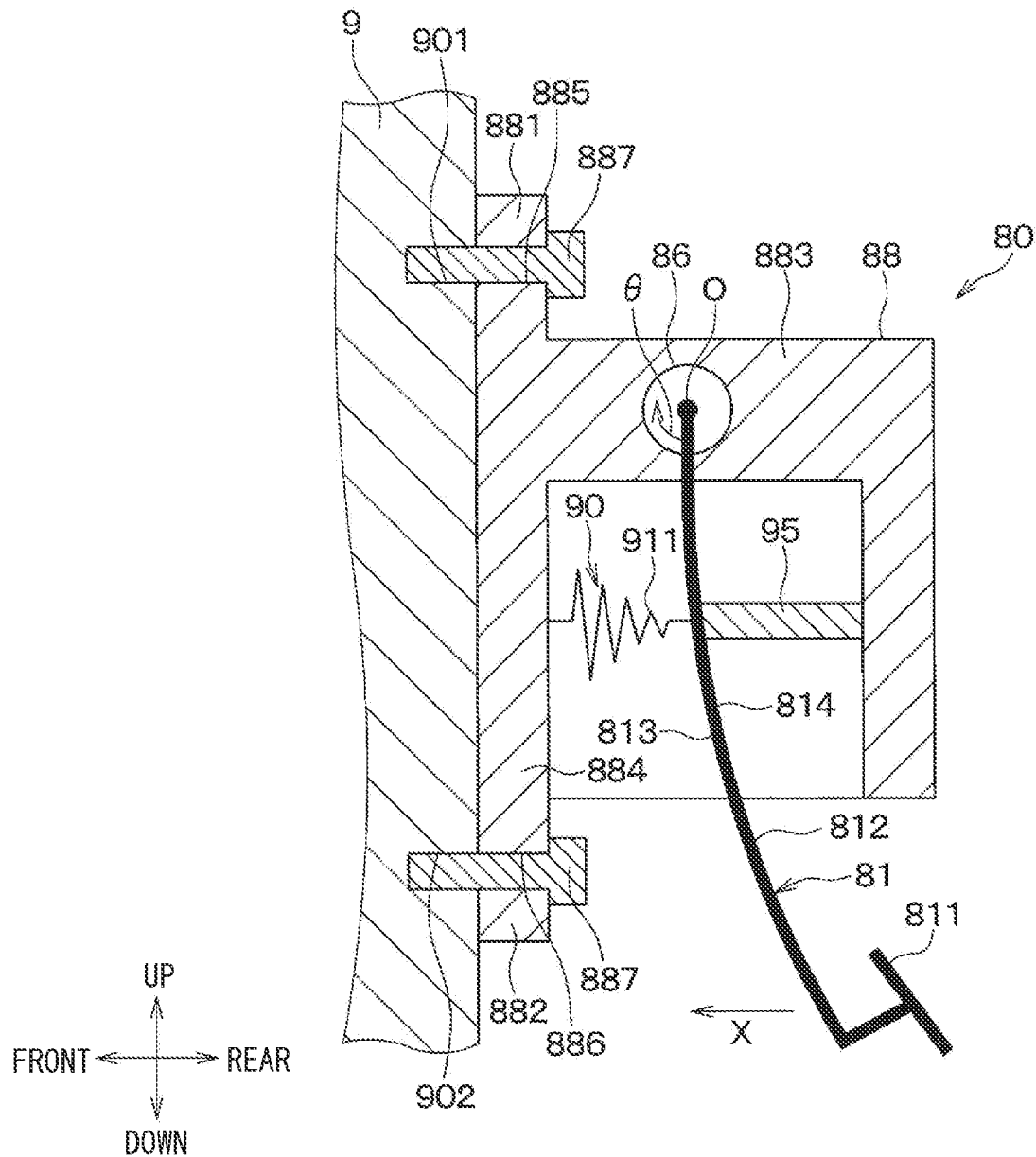
FIG. 11 is a cross-sectional view of a vehicle brake device according to a second embodiment.

As illustrated in FIG. 11, a conical elastic member 911 of the reaction force generator 90 is made of a conical coil spring.

In this case, when the brake pedal 81 is operated by a depression force of the driver of the vehicle 6, the conical elastic member 911 is deformed. Consequently, a restoring force of the conical elastic member 911 is generated, and thus a reaction force Fr is generated. The restoring force of the conical elastic member 911 increases as a deformation amount of the conical elastic member 911 increases. Moreover, since the conical elastic member 911 is a conical coil spring, an elastic modulus of the conical elastic member 911 changes according to the deformation amount of the conical elastic member 911. Here, the elastic modulus of the conical elastic member 911 increases as the deformation amount of the conical elastic member 911 increases. Therefore, the change amount of the restoring force of the conical elastic member 911 with respect to the deformation amount of the conical elastic member 911 increases as the deformation amount of the conical elastic member 911 increases.

Figure 12:
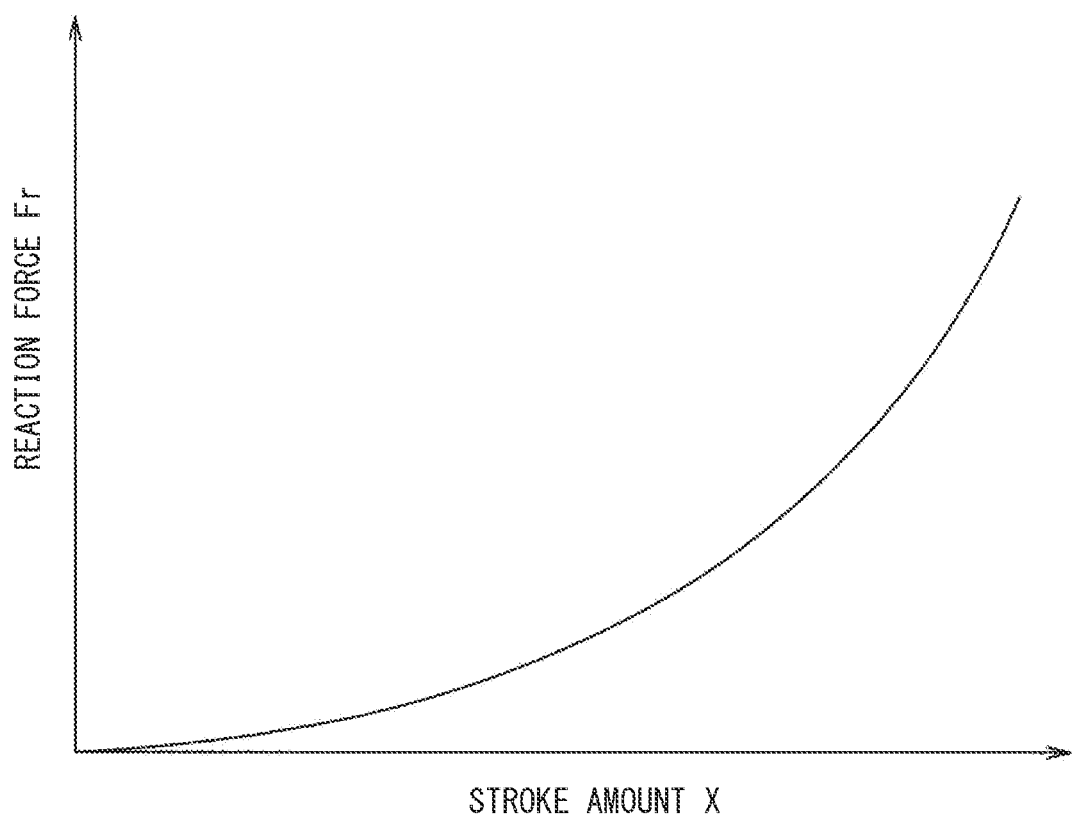
FIG. 12 is a relationship diagram between a stroke amount and a reaction force.

Therefore, as illustrated in FIG. 12, the reaction force Fr increases as the stroke amount X increases. The change amount of the reaction force Fr with respect to the stroke amount X increases as the stroke amount X increases.

Also in the second embodiment, similar effects to those of the first embodiment are exhibited.

Third Embodiment

A third embodiment is different from the first embodiment in the form of the elastic member 91 of the reaction force generator 90. Other configurations are similar to those of the first embodiment.

Figure 13:
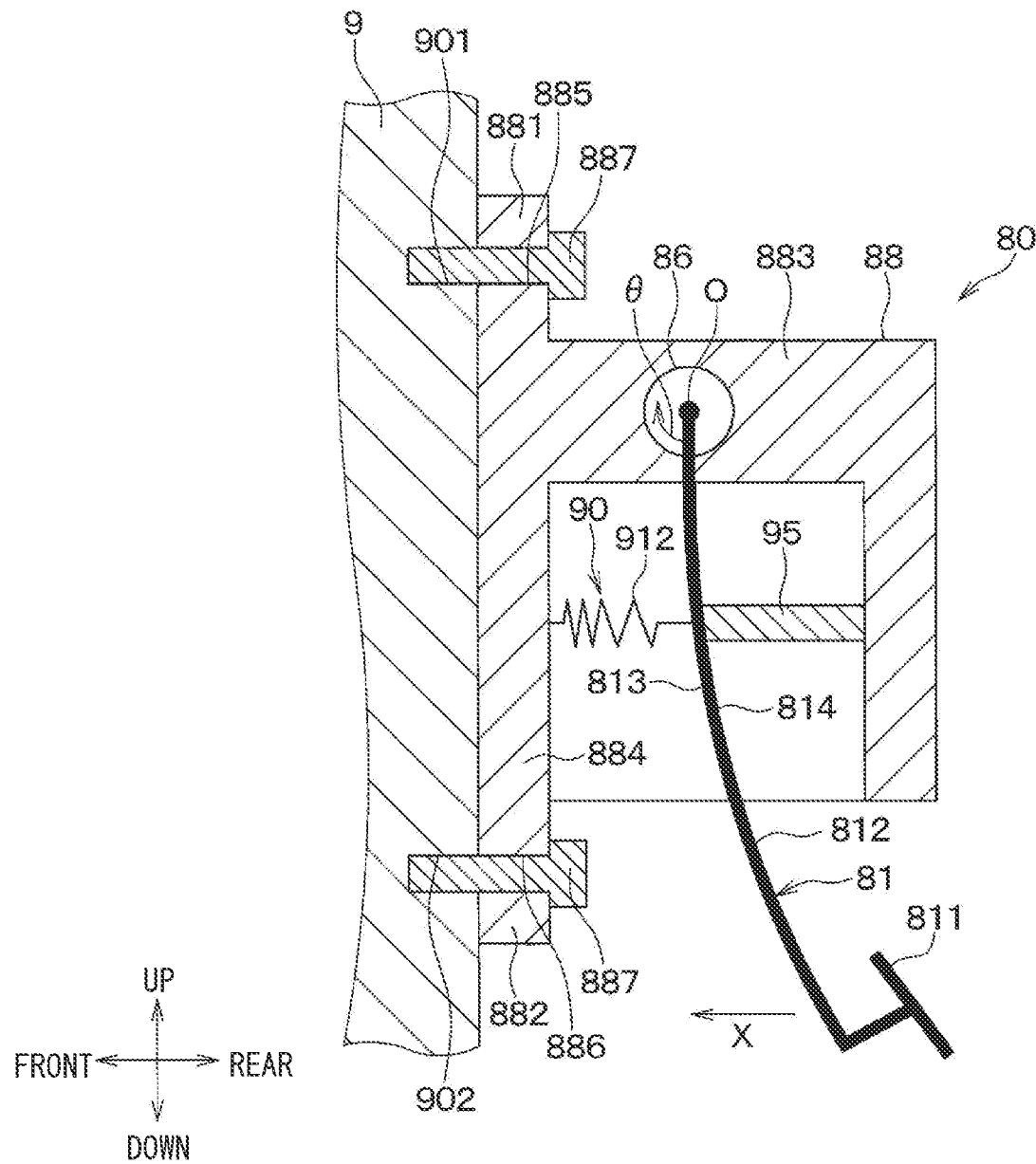
FIG. 13 is a cross-sectional view of a vehicle brake device according to a third embodiment.

As illustrated in FIG. 13, an unequal elastic member 912 of the reaction force generator 90 is made of an unequal pitch spring.

In this case, when the brake pedal 81 is operated by a depression force of the driver of the vehicle 6, the unequal elastic member 912 is deformed. Consequently, a restoring force of the unequal elastic member 912 is generated, and thus a reaction force Fr is generated. The restoring force of the unequal elastic member 912 increases as a deformation amount of the unequal elastic member 912 increases. Moreover, since the unequal elastic member 912 is an unequal pitch spring, an elastic modulus of the unequal elastic member 912 changes when the deformation amount of the unequal elastic member 912 becomes equal to or more than a predetermined amount. Here, when the deformation amount of the unequal elastic member 912 becomes equal to or more than the predetermined amount, the elastic modulus of the unequal elastic member 912 increases. Thus, when the deformation amount of the unequal elastic member 912 becomes equal to or more than the predetermined amount, a change amount of the restoring force of the unequal elastic member 912 with respect to the deformation amount of the unequal elastic member 912 increases.

Figure 14:
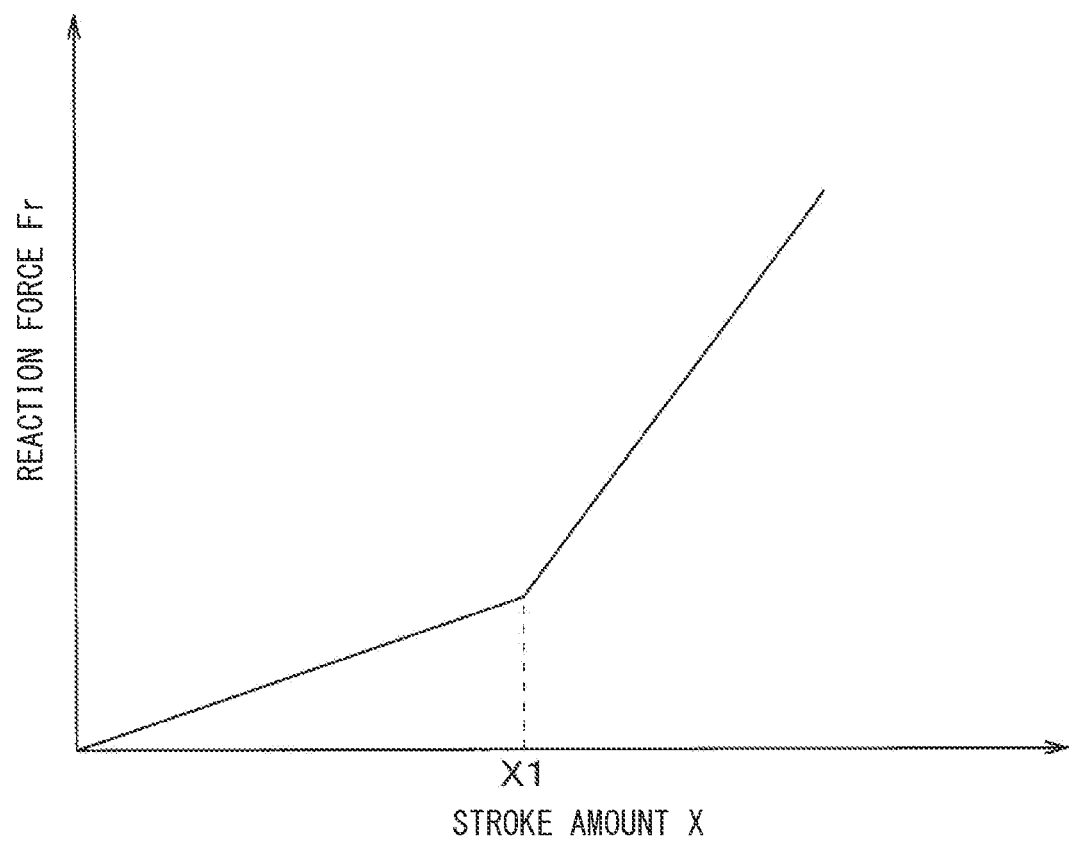
FIG. 14 is a relationship diagram between a stroke amount and a reaction force.

Therefore, here, as illustrated in FIG. 14, when the stroke amount X is less than X1, the reaction force Fr increases as the stroke amount X increases. The change amount of the reaction force Fr with respect to the stroke amount X when the stroke amount X is equal to or more than X1 is larger than the change amount of the reaction force Fr with respect to the stroke amount X when the stroke amount X is less than X1. Moreover, when the stroke amount X is equal to or more than X1, the reaction force Fr increases as the stroke amount X increases. X1 is set by the shape or the like of the unequal elastic member 912.

Also in the third embodiment, similar effects to those of the first embodiment are exhibited.

Fourth Embodiment

A fourth embodiment is different from the first embodiment in the forms of the housing 88 and the elastic member 91 of the reaction force generator 90. Other configurations are similar to those of the first embodiment.

Figure 15:
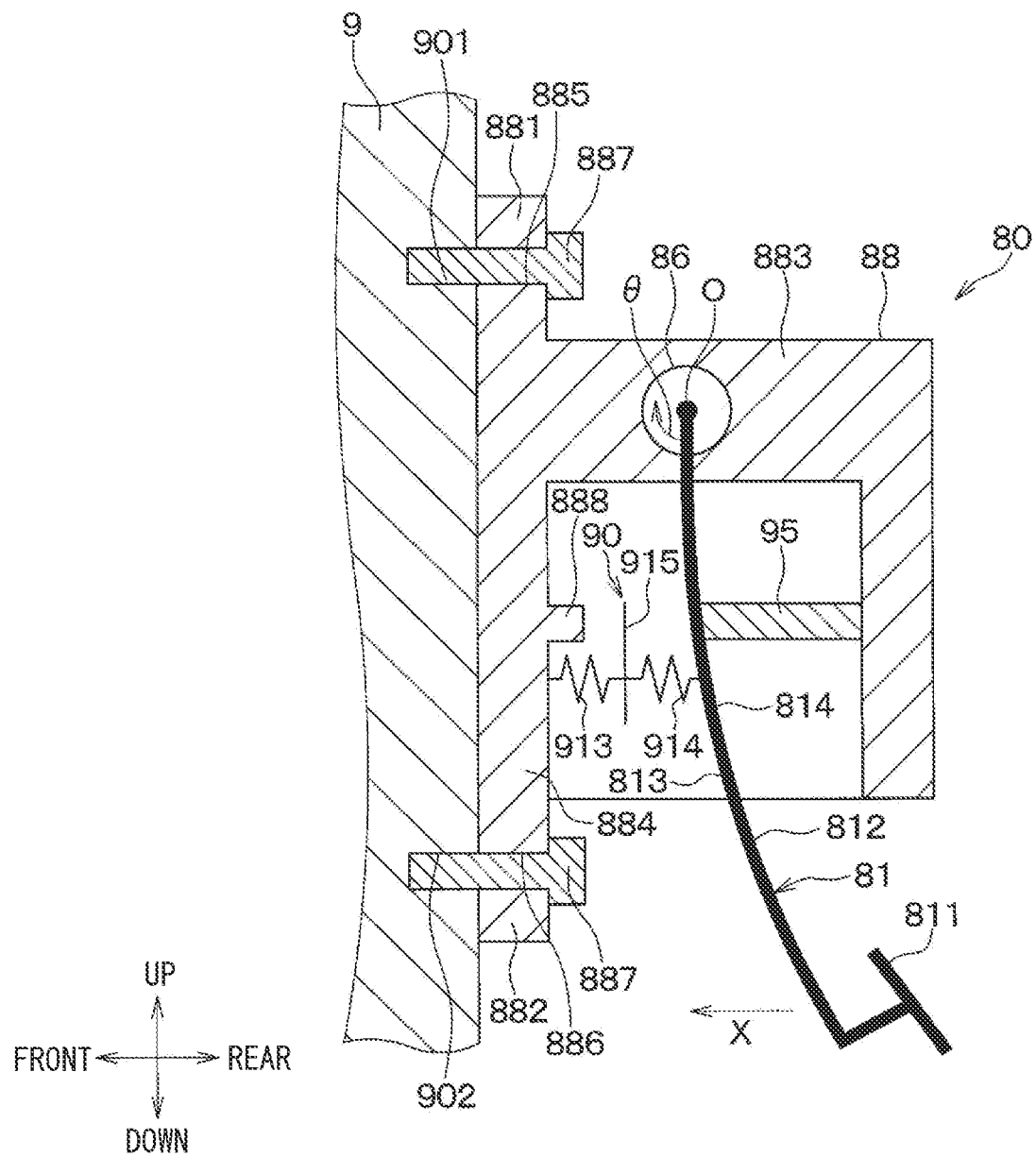
FIG. 15 is a cross-sectional view of a vehicle brake device according to a fourth embodiment.

As illustrated in FIG. 15, the housing 88 further includes a housing protrusion 888 protruding rearward from a portion of the front side of the housing cylindrical portion 884.

The reaction force generator 90 has a first elastic member 913, a second elastic member 914, and a plate part 915.

The first elastic member 913 is an equal pitch spring, and is connected to the front side of the housing cylindrical portion 884 and the plate part 915.

The second elastic member 914 is an equal pitch spring, and is connected to the plate part 915 and the front surface 813 of the lever part 812. An elastic modulus of the second elastic member 914 is larger than an elastic modulus of the first elastic member 913.

The plate part 915 is disposed so as to face the housing protrusion 888, and comes into contact with the housing protrusion 888 when the brake pedal 81 is stepped on.

In this case, when the brake pedal 81 is stepped on, the second elastic member 914 is not deformed, and the first elastic member 913 supported by the housing cylindrical portion 884 is deformed. At this time, a reaction force Fr is generated by the restoring force of the first elastic member 913. When the first elastic member 913 is deformed by a predetermined amount or more, the plate part 915 comes into contact with the housing protrusion 888. At this time, since the plate part 915 is supported by the housing protrusion 888, a deformation of the first elastic member 913 connected to the plate part 915 is stopped. When the brake pedal 81 is further stepped on from this state, the second elastic member 914 connected to the lever part 812 is deformed instead of the first elastic member 913. At this time, the reaction force Fr is generated by the restoring force of the first elastic member 913 and the second elastic member 914.

Figure 16:
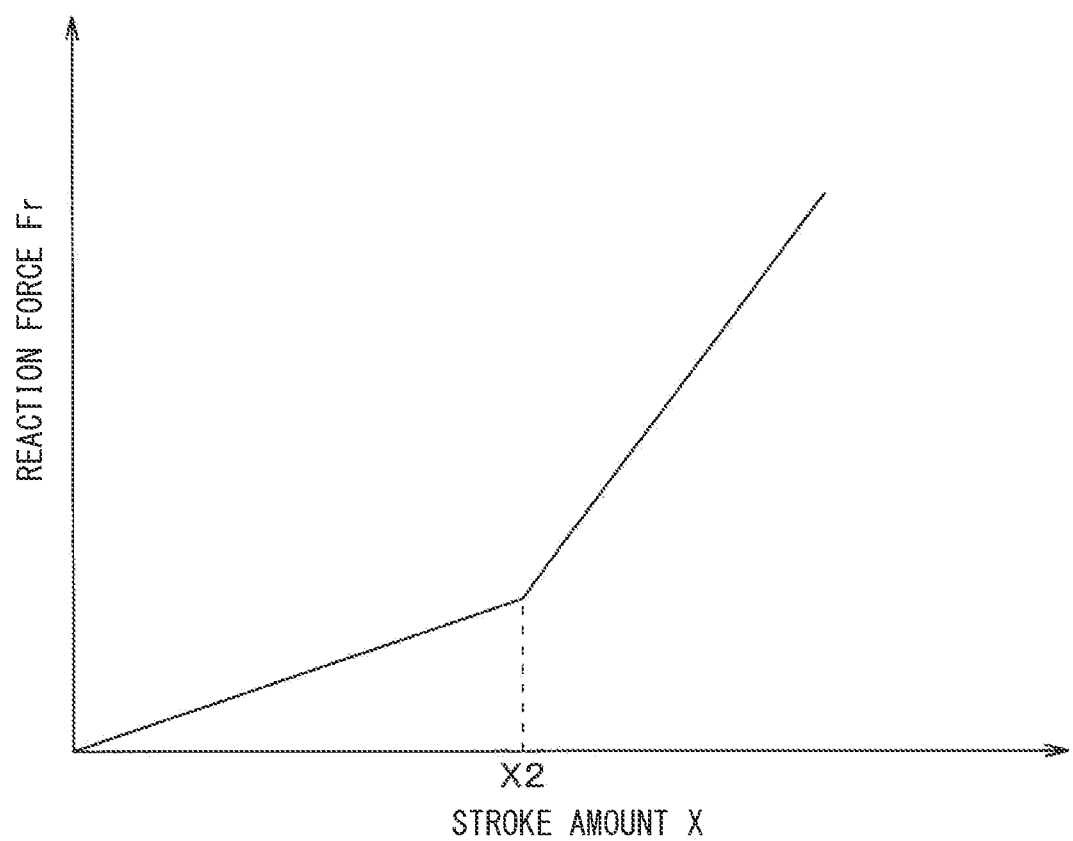
FIG. 16 is a relationship diagram between a stroke amount and a reaction force.

Therefore, here, as illustrated in FIG. 16, when the stroke amount X is less than X2, the reaction force Fr increases as the stroke amount X increases. The change amount of the reaction force Fr with respect to the stroke amount X when the stroke amount X is equal to or more than X2 is larger than the change amount of the reaction force Fr with respect to the stroke amount X when the stroke amount X is less than X2. Moreover, when the stroke amount X is equal to or more than X2, here, when the plate part 915 and the housing protrusion 888 are in contact with each other, the reaction force Fr increases as the stroke amount X increases. Here, since the elastic modulus of the second elastic member 914 is larger than the elastic modulus of the first elastic member 913, the reaction force Fr is relatively large when the stroke amount X is equal to or more than X2. Thus, a force corresponding to the braking force of the vehicle 6 easily acts on the driver of the vehicle 6, so that driving of the vehicle 6 becomes easy. X2 is set by a distance from the housing protrusion 888 to the plate part 915, and the like.

Also in the fourth embodiment, similar effects to those of the first embodiment are exhibited.

Fifth Embodiment

A fifth embodiment is different from the first embodiment in the form of the elastic member 91 of the reaction force generator 90. Other configurations are similar to those of the first embodiment.

Figure 17:
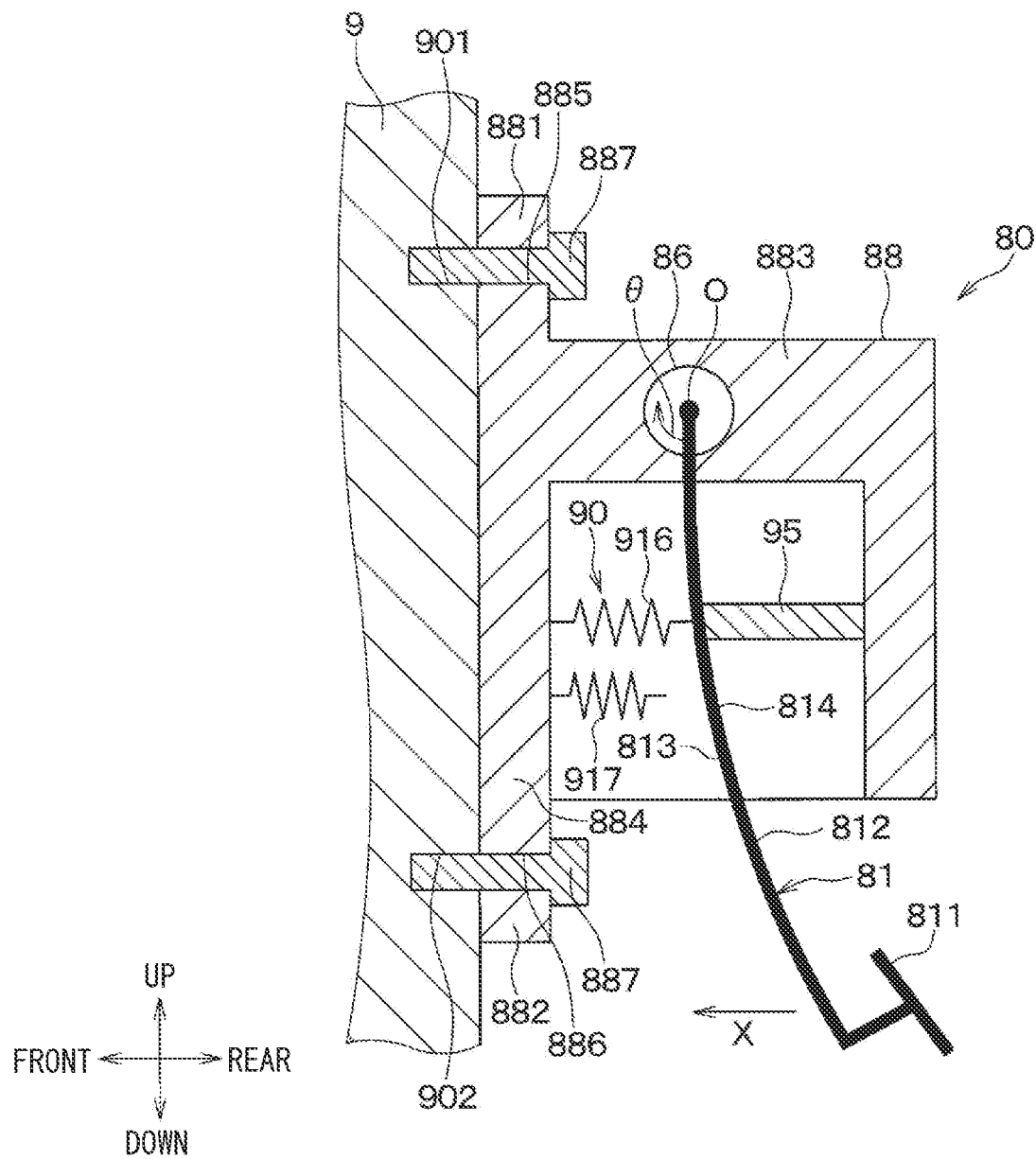
FIG. 17 is a cross-sectional view of a vehicle brake device according to a fifth embodiment.

As illustrated in FIG. 17, the reaction force generator 90 has a first parallel elastic member 916 and a second parallel elastic member 917.

The first parallel elastic member 916 is an equal pitch spring, and is connected to the front side of the housing cylindrical portion 884 and the front surface 813 of the lever part 812.

The second parallel elastic member 917 is an equal pitch spring and is connected to the front side of the housing cylindrical portion 884. The second parallel elastic member 917 is not connected to the lever part 812 but faces the front surface 813 of the lever part 812. Moreover, the second parallel elastic member 917 is disposed in parallel with the first parallel elastic member 916. An elastic modulus of the second parallel elastic member 917 is larger than an elastic modulus of the first parallel elastic member 916.

In this case, when the brake pedal 81 is stepped on, the second parallel elastic member 917 not connected to the lever part 812 is not deformed, and the first parallel elastic member 916 connected to the lever part 812 is deformed. At this time, a reaction force Fr is generated by the restoring force of the first parallel elastic member 916. When the first parallel elastic member 916 is deformed by a predetermined amount or more, the lever part 812 and the second parallel elastic member 917 come into contact with each other. Consequently, the first parallel elastic member 916 is deformed, and the second parallel elastic member 917 is deformed. At this time, the reaction force Fr is generated by the first parallel elastic member 916 and the second parallel elastic member 917.

Figure 18:
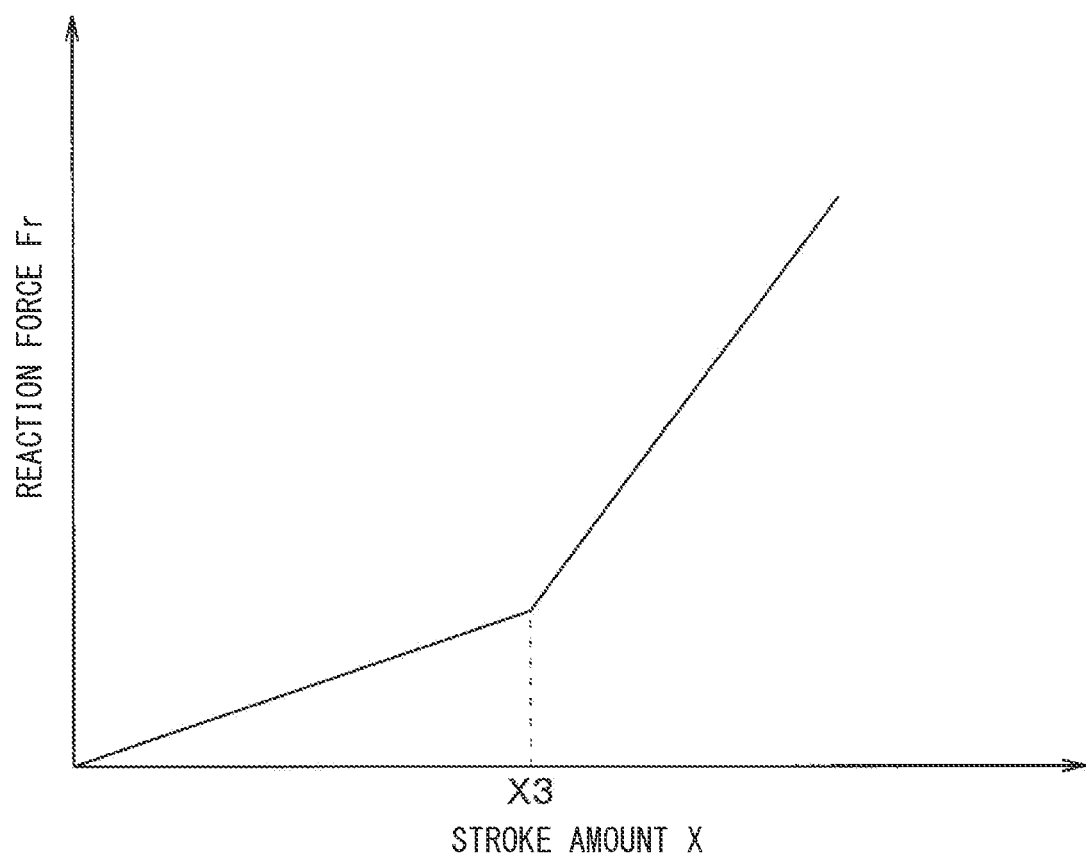
FIG. 18 is a relationship diagram between a stroke amount and a reaction force.

Therefore, here, as illustrated in FIG. 18, when the stroke amount X is less than X3, the reaction force Fr increases as the stroke amount X increases. The change amount of the reaction force Fr with respect to the stroke amount X when the stroke amount X is equal to or more than X3 is larger than the change amount of the reaction force Fr with respect to the stroke amount X when the stroke amount X is less than X3. Moreover, when the stroke amount X is equal to or more than X3, the reaction force Fr increases as the stroke amount X increases. Here, since the elastic modulus of the second parallel elastic member 917 is larger than the elastic modulus of the first parallel elastic member 916, the reaction force Fr is relatively large when the stroke amount X is equal to or more than X3. Thus, a force corresponding to the braking force of the vehicle 6 easily acts on the driver of the vehicle 6, so that driving of the vehicle 6 becomes easy. X3 is set by a distance from the lever part 812 to the second parallel elastic member 917, and the like.

Also in the fifth embodiment, similar effects to those of the first embodiment are exhibited.

Sixth Embodiment

Figure 19:
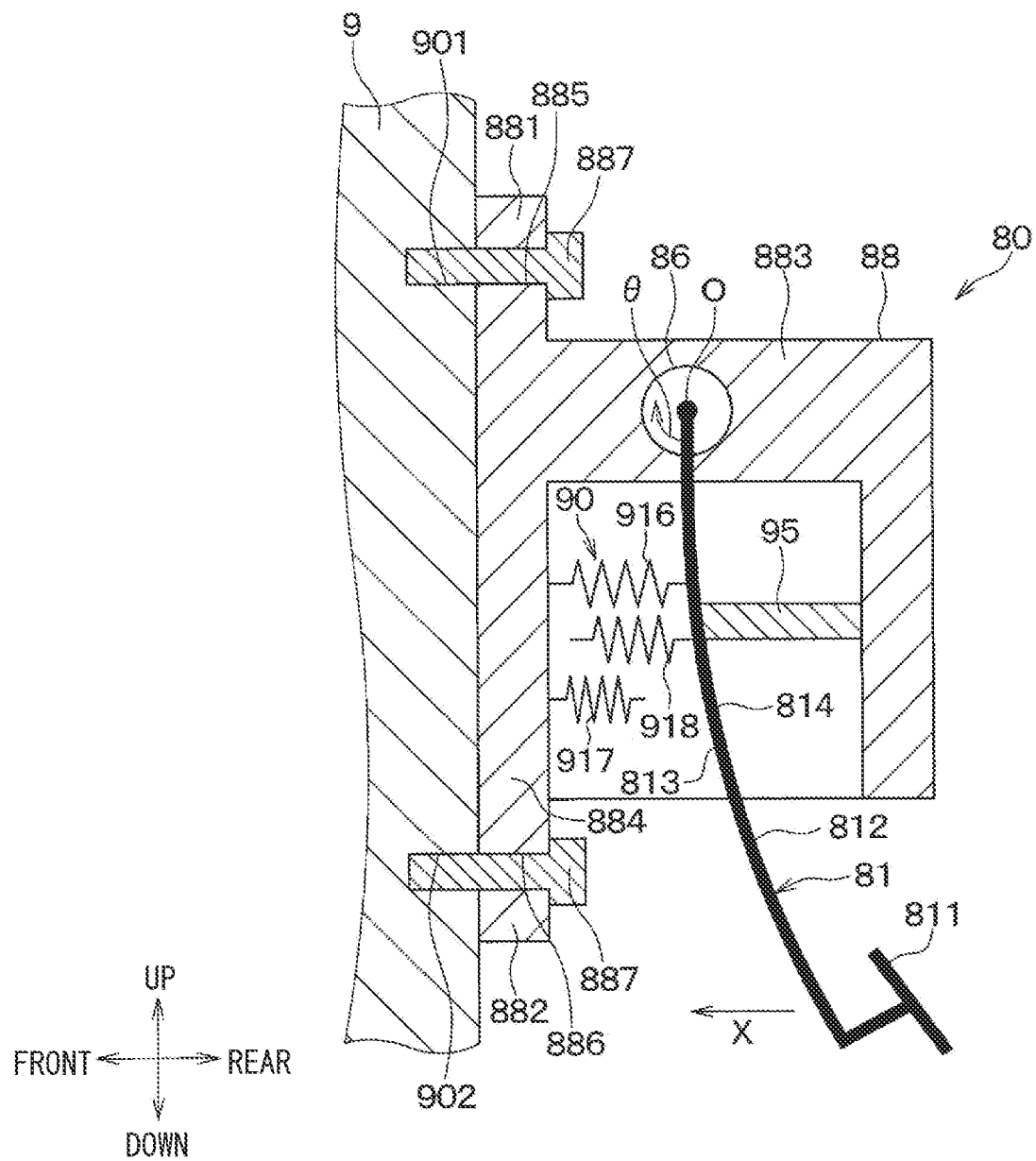
FIG. 19 is a cross-sectional view of a vehicle brake device according to a sixth embodiment.

In a sixth embodiment, as illustrated in FIG. 19, the reaction force generator 90 further includes a third parallel elastic member 918. Other configurations are similar to those of the fifth embodiment.

The third parallel elastic member 918 is an equal pitch spring and is connected to the front surface 813 of the lever part 812. The third parallel elastic member 918 is not connected to the housing cylindrical portion 884 but faces the front side of the housing cylindrical portion 884. Moreover, the third parallel elastic member 918 is disposed in parallel with the first parallel elastic member 916 and the second parallel elastic member 917. An elastic modulus of the third parallel elastic member 918 is larger than the elastic modulus of the first parallel elastic member 916 and smaller than the elastic modulus of the second parallel elastic member 917. The elastic modulus of the third parallel elastic member 918 may be larger than the elastic modulus of the second parallel elastic member 917.

In this case, the second parallel elastic member 917 is not connected to the lever part 812. The third parallel elastic member 918 is not connected to the housing cylindrical portion 884. Thus, when the brake pedal 81 is stepped on, the second parallel elastic member 917 and the third parallel elastic member 918 are not deformed, and the first parallel elastic member 916 is deformed. At this time, a reaction force Fr is generated from the restoring force of the first parallel elastic member 916. When the first parallel elastic member 916 is deformed by a predetermined amount or more, the front side of the housing cylindrical portion 884 and the third parallel elastic member 918 come into contact with each other. Consequently, the first parallel elastic member 916 is deformed, and the third parallel elastic member 918 is deformed. At this time, the reaction force Fr is generated by the first parallel elastic member 916 and the third parallel elastic member 918. When the first parallel elastic member 916 and the third parallel elastic member 918 are deformed by a predetermined amount or more, the lever part 812 and the second parallel elastic member 917 come into contact with each other. Consequently, the first parallel elastic member 916 and the third parallel elastic member 918 are deformed, and the second parallel elastic member 917 is deformed. At this time, the reaction force Fr is generated by the first parallel elastic member 916, the second parallel elastic member 917, and the third parallel elastic member 918.

Figure 20:
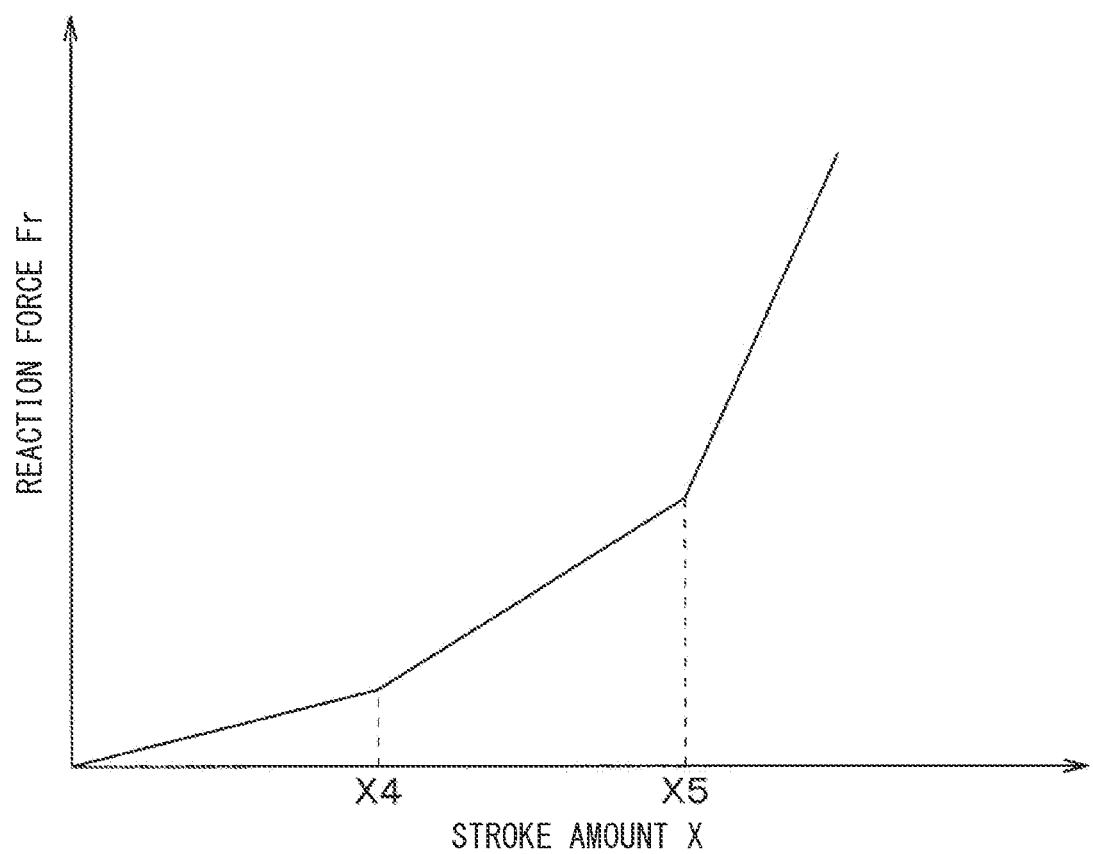
FIG. 20 is a relationship diagram between a stroke amount and a reaction force.

Therefore, here, as illustrated in FIG. 20, when the stroke amount X is less than X4, the reaction force Fr increases as the stroke amount X increases. The change amount of the reaction force Fr with respect to the stroke amount X when the stroke amount X is equal to or more than X4 and less than X5 is larger than the change amount of the reaction force Fr with respect to the stroke amount X when the stroke amount X is less than X4. The reaction force Fr increases as the stroke amount X increases when the stroke amount X is equal to or more than X4 and less than X5. The change amount of the reaction force Fr with respect to the stroke amount X when the stroke amount X is equal to or more than X5 is larger than the change amount of the reaction force Fr with respect to the stroke amount X when the stroke amount X is equal to or more than X4 and less than X5. The reaction force Fr increases as the stroke amount X increases when the stroke amount X is equal to or more than X5. X4 is set by a distance from the front side of the housing cylindrical portion 884 to the third parallel elastic member 918, and the like. X5 is set by a distance from the lever part 812 to the second parallel elastic member 917, and the like.

Also in the sixth embodiment, similar effects to those of the first embodiment are exhibited.

Seventh Embodiment

In a seventh embodiment, the forms of the stopper 95 and the housing 88 are different. Other configurations are similar to those of the first embodiment.

Figure 21:
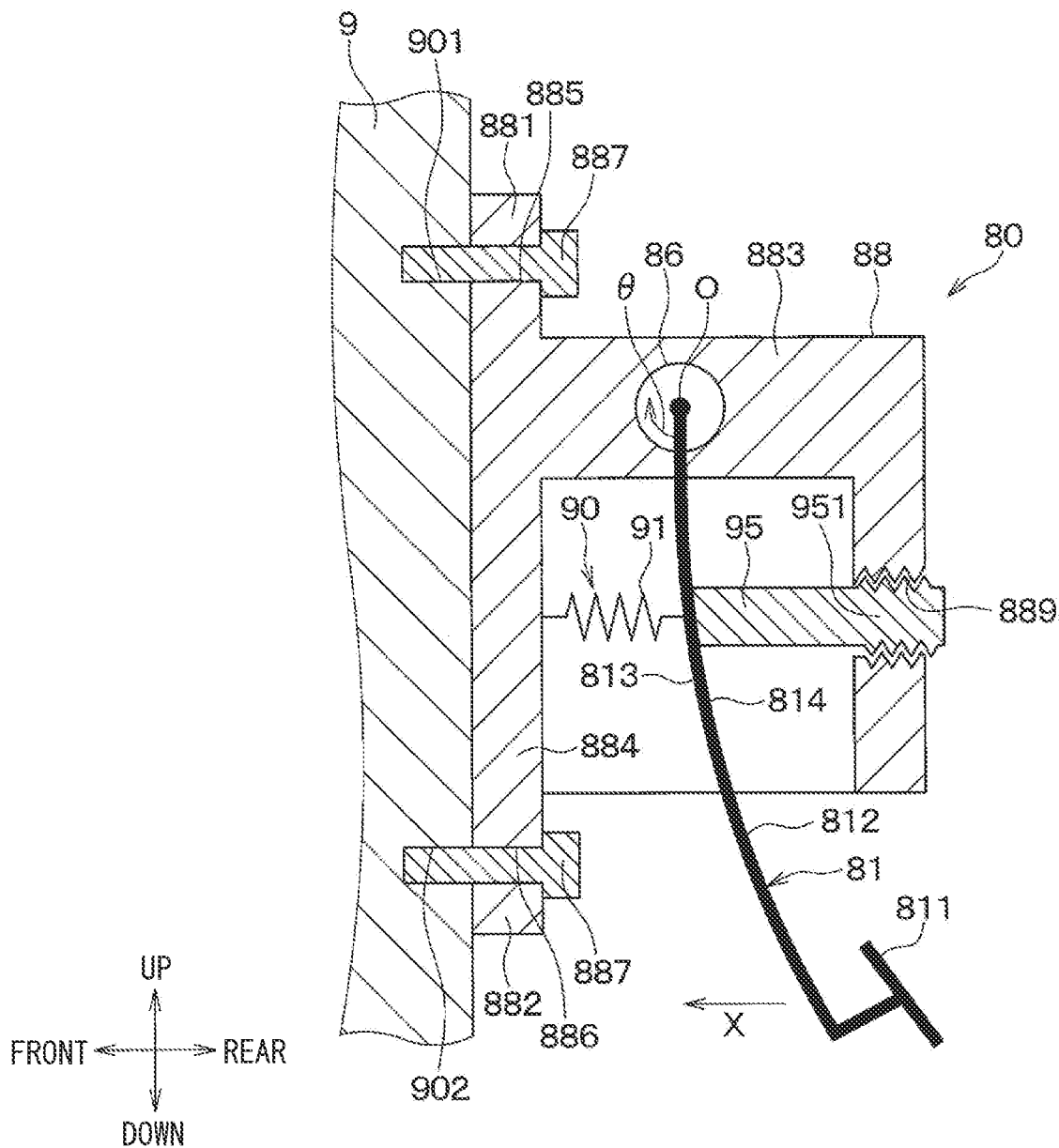
FIG. 21 is a cross-sectional view of a vehicle brake device according to a seventh embodiment.

As illustrated in FIG. 21, the stopper 95 has a male threaded portion 951. The male threaded portion 951 is inserted into a female threaded hole 889 of the housing 88 described later.

The housing 88 further includes the female threaded hole 889. Here, the female threaded hole 889 is formed on the rear side of the housing cylindrical portion 884. The female threaded hole 889 is formed in a shape corresponding to the male threaded portion 951 of the stopper 95.

In this case, by rotating the male threaded portion 951 of the stopper 95, the male threaded portion 951 moves in the female threaded hole 889, and thus the stopper 95 moves in a direction along the female threaded hole 889, here, a front-rear direction. Thus, the position of the brake pedal 81 can be adjusted by adjusting the position of the stopper 95 in contact with the brake pedal 81, so that positional accuracy of the brake pedal 81 can be improved. Therefore, the accuracy of the reaction force Fr can be improved.

Also in the seventh embodiment, similar effects to those of the first embodiment are exhibited.

Eighth Embodiment

In an eighth embodiment, the form of the stopper 95 is different. Other configurations are similar to those of the first embodiment.

Figure 22:
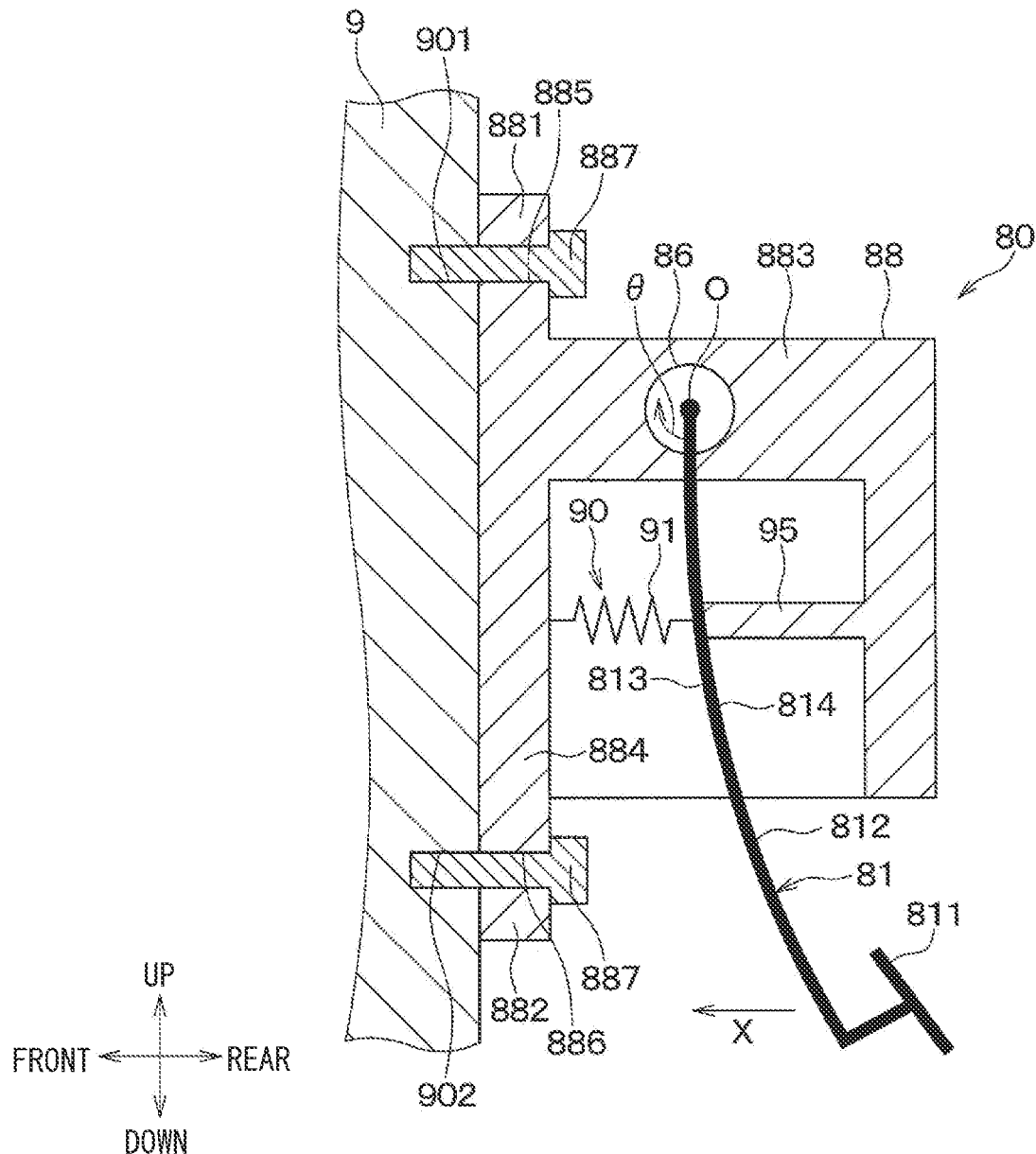
FIG. 22 is a cross-sectional view of a vehicle brake device according to an eighth embodiment.

As illustrated in FIG. 22, the stopper 95 is integrated with the housing 88. Thus, the stopper 95 is easily formed, and it is not necessary to attach the stopper 95 to the housing 88, so that there is no variation when the stopper 95 is attached to the housing 88. Therefore, positional accuracy of the stopper 95 is improved, and the positional accuracy of the brake pedal 81 in contact with the stopper 95 is thereby improved. Therefore, the accuracy of the reaction force Fr can be improved.

Also in the eighth embodiment, similar effects to those of the first embodiment are exhibited.

Ninth Embodiment

In a ninth embodiment, the form of the elastic member 91 of the reaction force generator 90 is different. Other configurations are similar to those of the first embodiment.

Figure 23:
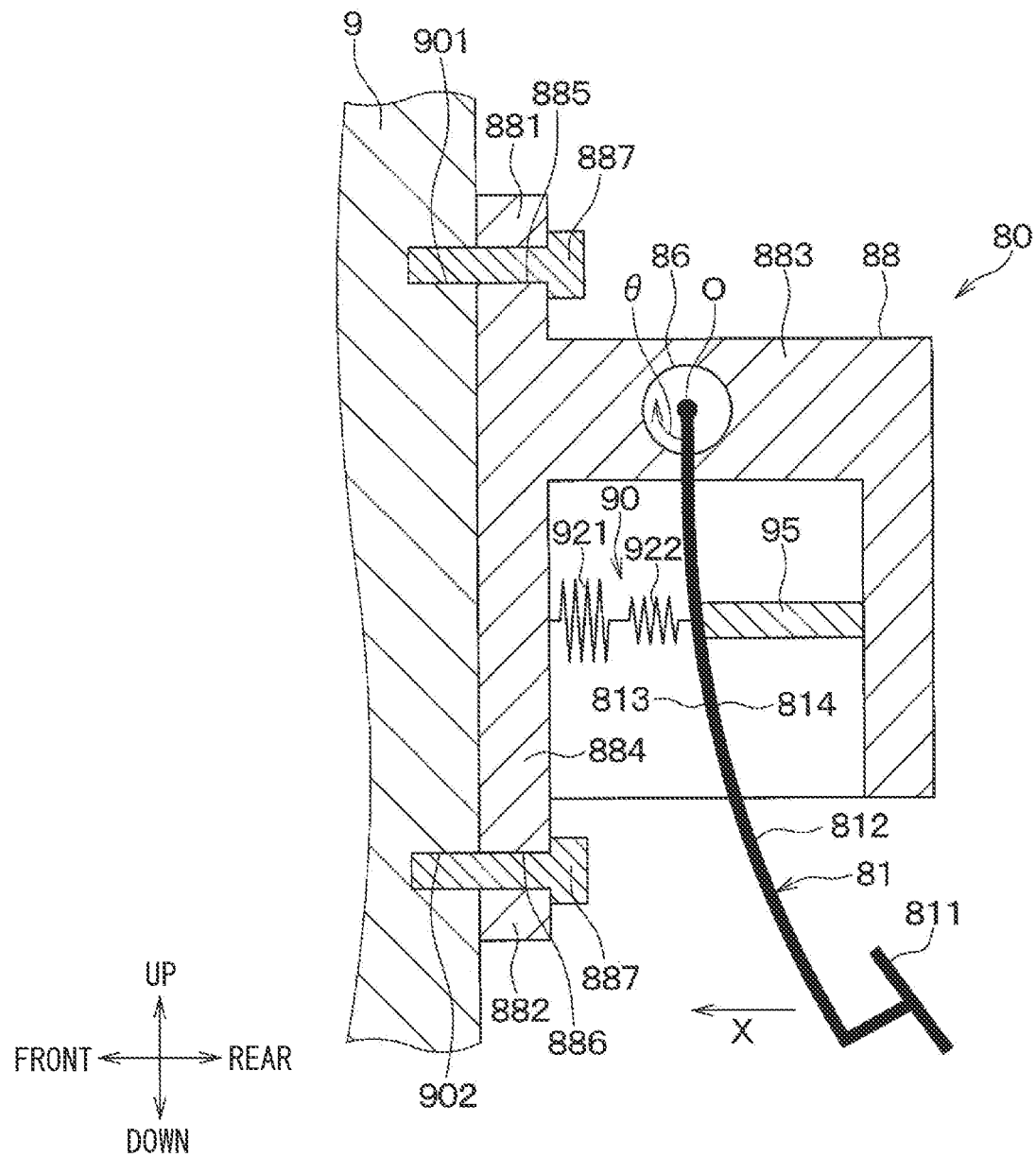
FIG. 23 is a cross-sectional view of a vehicle brake device according to a ninth embodiment.

As illustrated in FIG. 23, the reaction force generator 90 has a first series elastic member 921 and a second series elastic member 922.

The first series elastic member 921 is an equal pitch spring, and is connected to the front side of the housing cylindrical portion 884 and the second series elastic member 922.

The second series elastic member 922 is an equal pitch spring, and is connected to the first series elastic member 921 and the front surface 813 of the lever part 812. Thus, the first series elastic member 921 and the second series elastic member 922 are connected in series. Here, an elastic modulus of the second series elastic member 922 may be different from or the same as an elastic modulus of the first series elastic member 921.

In this case, when the brake pedal 81 is stepped on, the first series elastic member 921 and the second series elastic member 922 are deformed. Here, the elastic modulus of the first series elastic member 921 is denoted by Ks1. A deformation amount of the first series elastic member 921 when the brake pedal 81 is stepped on is denoted by Xs1. The elastic modulus of the second series elastic member 922 is denoted by Ks2. A deformation amount of the second series elastic member 922 when the brake pedal 81 is stepped on is denoted by Xs2. At this time, since the first series elastic member 921 and the second series elastic member 922 are connected to each other, the reaction force Fr is expressed by the following relational expression (2).

[Mathematical Expression 2]

$$Fr = \frac{Ks1 \times Ks2}{Ks1 + Ks2}(Xs1 + Xs2) \tag{2}$$

Also in the ninth embodiment, similar effects to those of the first embodiment are exhibited.

Tenth Embodiment

In a tenth embodiment, the form of the second parallel elastic member 917 of the reaction force generator 90 is different. Other configurations are similar to those of the fifth embodiment.

Figure 24:
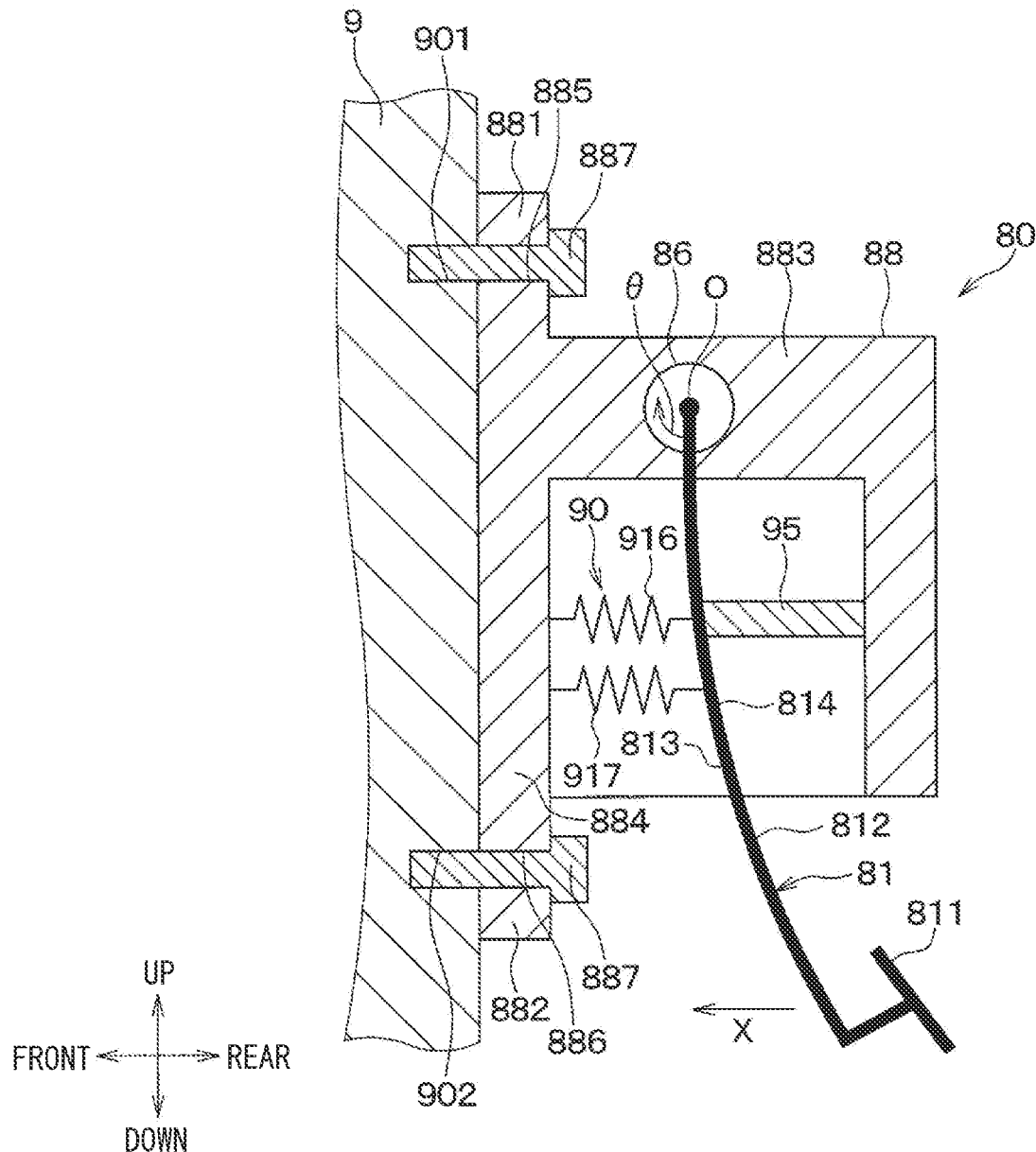
FIG. 24 is a cross-sectional view of a vehicle brake device according to a tenth embodiment.

As illustrated in FIG. 24, the reaction force generator 90 has a first parallel elastic member 916 and a second parallel elastic member 917.

The first parallel elastic member 916 is an equal pitch spring, and is connected to the front side of the housing cylindrical portion 884 and the front surface 813 of the lever part 812.

The second parallel elastic member 917 is an equal pitch spring, and is connected to the front side of the housing cylindrical portion 884 and the front surface 813 of the lever part 812. Therefore, here, the second parallel elastic member 917 is disposed in parallel with the first parallel elastic member 916.

In this case, when the brake pedal 81 is stepped on, the first parallel elastic member 916 is deformed together with the second parallel elastic member 917. Here, the elastic modulus of the first parallel elastic member 916 is denoted by Kp1. A deformation amount of the first parallel elastic member 916 when the brake pedal 81 is stepped on is denoted by Xp1. The elastic modulus of the second parallel elastic member 917 is denoted by Kp2. A deformation amount of the second parallel elastic member 917 when the brake pedal 81 is stepped on is denoted by Xp2. At this time, the reaction force Fr is expressed by the following relational expression (3).

[Mathematical Expression 3]

$$Fr = Kp1 \times Xp1 + Kp2 \times Xp2 \tag{3}$$

Also in the tenth embodiment, similar effects to those of the fifth embodiment are exhibited. In the tenth embodiment, the reaction force Fr is a force obtained by combining the restoring force of the first parallel elastic member 916 and the restoring force of the second parallel elastic member 917, and thus tends to be relatively large. Thus, a force corresponding to the braking force of the vehicle 6 easily acts on the driver of the vehicle 6, so that driving of the vehicle 6 becomes easy.

Eleventh Embodiment

In an eleventh embodiment, the forms of the first parallel elastic member 916 and the second parallel elastic member 917 described above are different. Other configurations are similar to those of the tenth embodiment.

Figure 25:
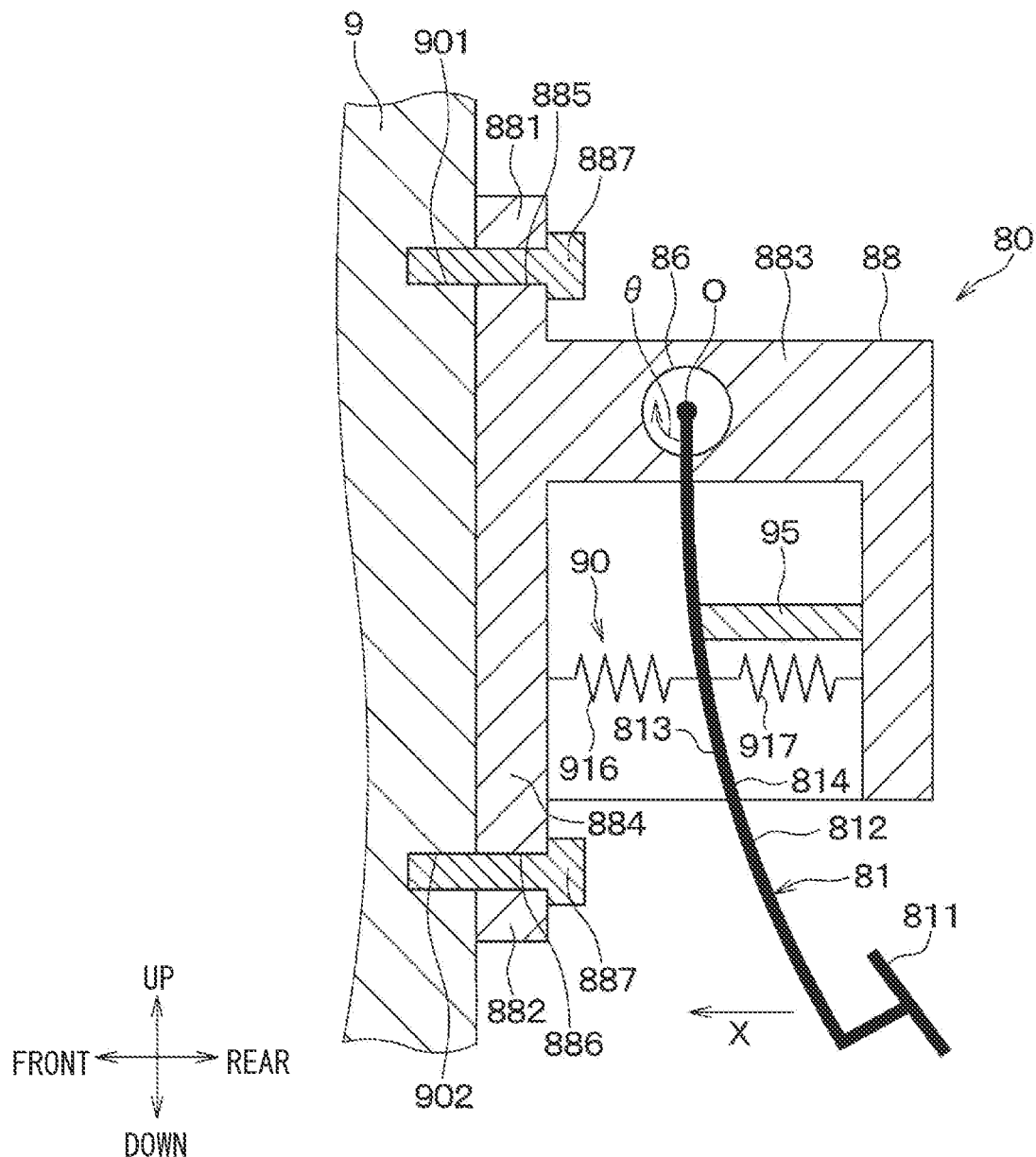
FIG. 25 is a cross-sectional view of a vehicle brake device according to an eleventh embodiment.

As illustrated in FIG. 25, the first parallel elastic member 916 is an equal pitch spring, and is connected to the front side of the housing cylindrical portion 884 and the front surface 813 of the lever part 812 similarly to as described above.

The second parallel elastic member 917 is connected to the rear surface 814 of the lever part 812 and the rear side of the housing cylindrical portion 884. The second parallel elastic member 917 is located on a straight line passing through the first parallel elastic member 916 and along an extending direction of the first parallel elastic member 916.

In this case, when the brake pedal 81 is stepped on, the second parallel elastic member 917 extends. Here, the second parallel elastic member 917 is located on the straight line passing through the first parallel elastic member 916 and along the extending direction of the first parallel elastic member 916. Thus, the deformation amount of the first parallel elastic member 916 when the brake pedal 81 is stepped on is equal to the deformation amount of the second parallel elastic member 917. Therefore, at this time, the reaction force Fr is expressed by the following relational expression (4).

[Mathematical Expression 4]

$$Fr = (Kp1 + Kp2) \times Xp1$$

$$Xp1 = Xp2 \qquad (4)$$

Also in the eleventh embodiment, similar effects to those of the tenth embodiment are exhibited.

Twelfth Embodiment

In a twelfth embodiment, the arrangements of the first parallel elastic member 916 and the second parallel elastic member 917 described above are different. Other configurations are similar to those of the eleventh embodiment.

Figure 26:
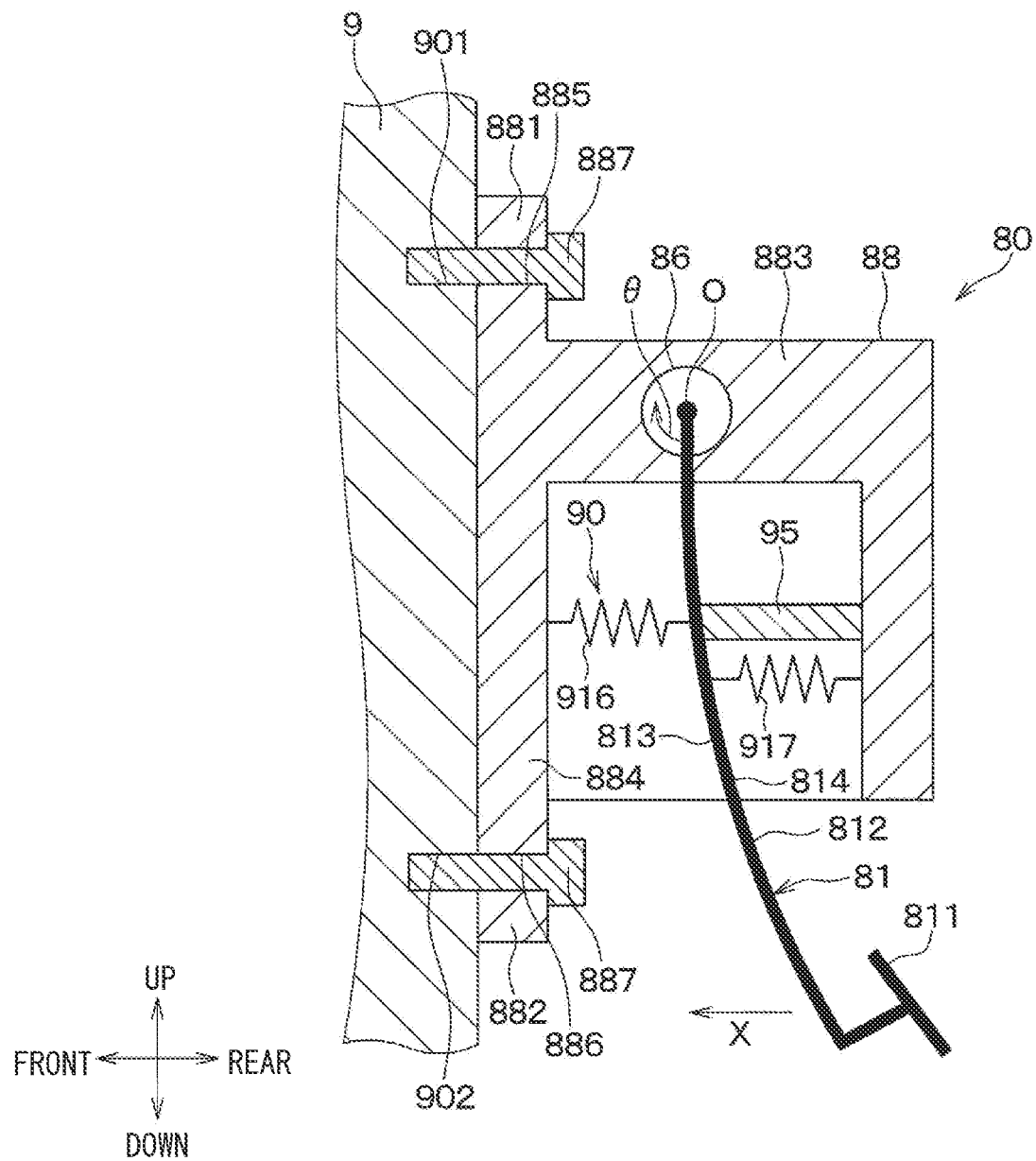
FIG. 26 is a cross-sectional view of a vehicle brake device according to a twelfth embodiment.

As illustrated in FIG. 26, the second parallel elastic member 917 is not positioned on the straight line passing through the first parallel elastic member 916 and along the extending direction of the first parallel elastic member 916. Here, the stopper 95 is located on the straight line passing through the first parallel elastic member 916 and along the extending direction of the first parallel elastic member 916.

Also in the twelfth embodiment, similar effects to those of the tenth embodiment are exhibited.

Thirteenth Embodiment

In a thirteenth embodiment, the arrangement of the first parallel elastic member 916 described above is different. Other configurations are similar to those of the fifth embodiment.

Figure 27:
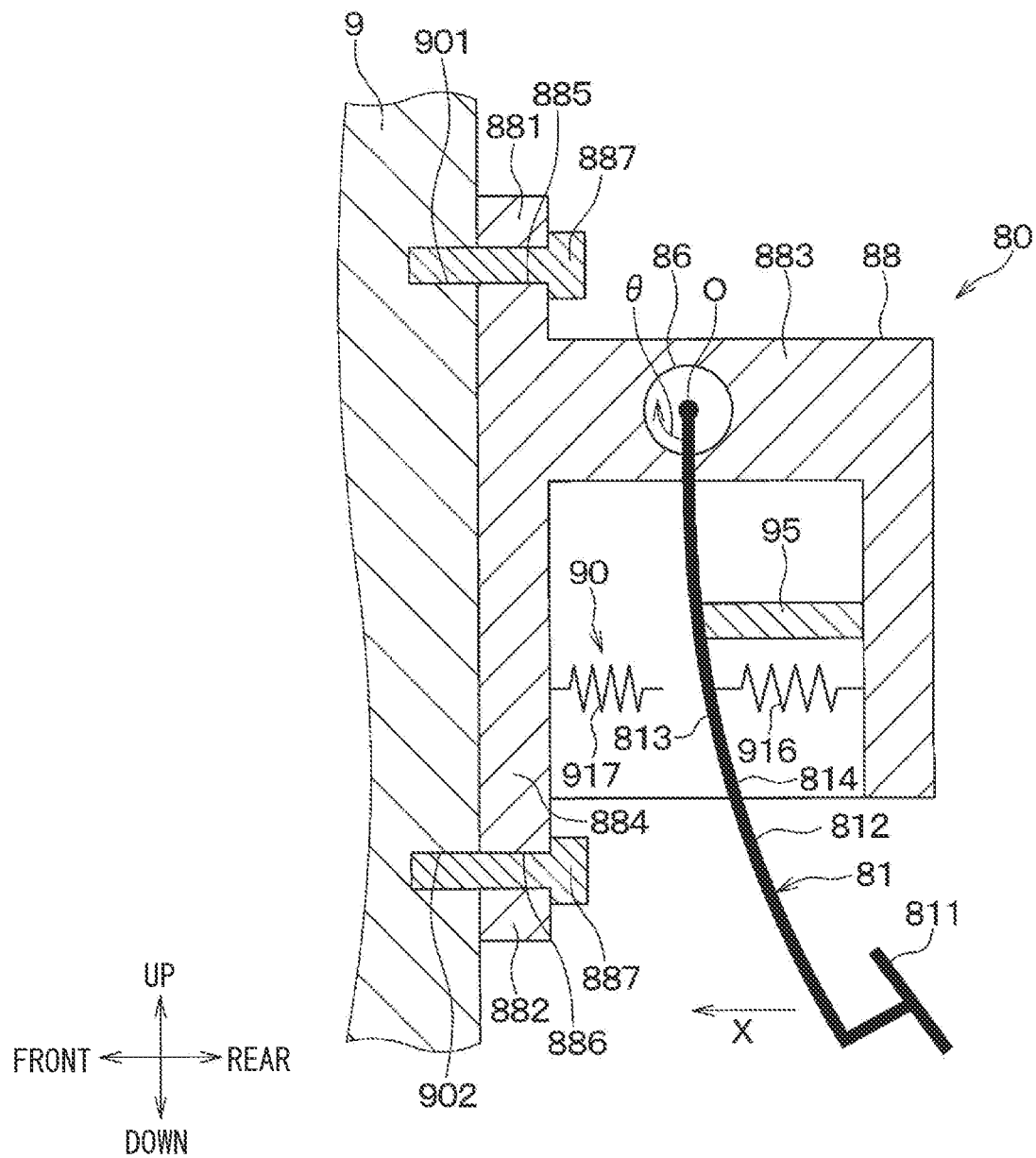
FIG. 27 is a cross-sectional view of a vehicle brake device according to a thirteenth embodiment.

As illustrated in FIG. 27, the first parallel elastic member 916 is connected to the rear surface 814 of the lever part 812 and the rear side of the housing cylindrical portion 884. In this case, when the brake pedal 81 is stepped on, the first parallel elastic member 916 extends. As in the fifth embodiment, the second parallel elastic member 917 is connected to the front side of the housing cylindrical portion 884. The second parallel elastic member 917 is not connected to the lever part 812 but faces the front surface 813 of the lever part 812.

Also in the thirteenth embodiment, similar effects to those of the fifth embodiment are exhibited.

Fourteenth Embodiment

A fourteenth embodiment is different from the first embodiment in the forms of the housing 88 and the brake pedal 81 and the arrangement of the stopper 95. Other configurations are similar to those of the first embodiment.

Figure 28:
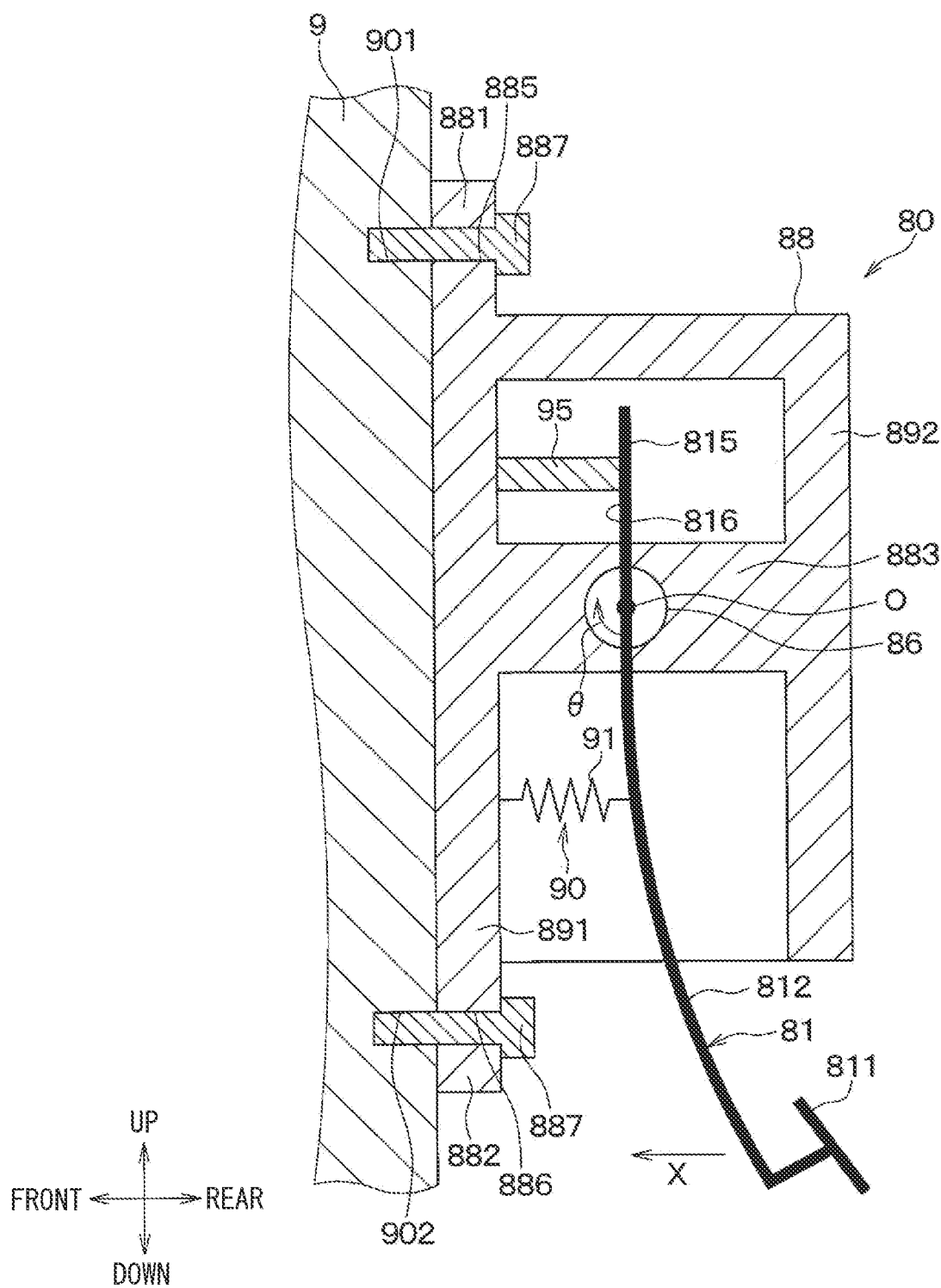
FIG. 28 is a cross-sectional view of a vehicle brake device according to a fourteenth embodiment.

As illustrated in FIG. 28, the housing 88 has a first housing cylindrical portion 891 and a second housing cylindrical portion 892 in addition to the first mounting portion 881, the second mounting portion 882, and the housing bottom portion 883 described above.

The first housing cylindrical portion 891 has a cylindrical shape, is connected to the housing bottom portion 883, and extends downward from the housing bottom portion 883. In this case, the second mounting portion 882 is connected to the first housing cylindrical portion 891 and extends downward from the first housing cylindrical portion 891.

The second housing cylindrical portion 892 has a cylindrical shape, is connected to the housing bottom portion 883, and extends upward from the housing bottom portion 883. In this case, the first mounting portion 881 is connected to the second housing cylindrical portion 892 and extends upward from the second housing cylindrical portion 892.

The lever part 812 of the brake pedal 81 has a lever extension portion 815. The lever extension portion 815 is connected to the rotation shaft O and extends upward from the rotation shaft O, here, toward the second housing cylindrical portion 892. Thus, the lever extension portion 815 is housed in the second housing cylindrical portion 892.

The stopper 95 is housed in the second housing cylindrical portion 892 and is connected to a front side of the second housing cylindrical portion 892. The stopper 95 is in contact with the extension front surface 816 of the lever extension portion 815. Thus, the stopper 95 stops the lever part 812 so that the brake pedal 81 is inhibited from rotating in the direction opposite to the rotation direction when the brake pedal 81 is stepped on.

Also in the fourteenth embodiment, similar effects to those of the first embodiment are exhibited.

Fifteenth Embodiment

A fifteenth embodiment is different from the first embodiment in the forms of the housing 88 and the brake pedal 81 and the arrangement of the stopper 95. Other configurations are similar to those of the first embodiment.

Figure 29:
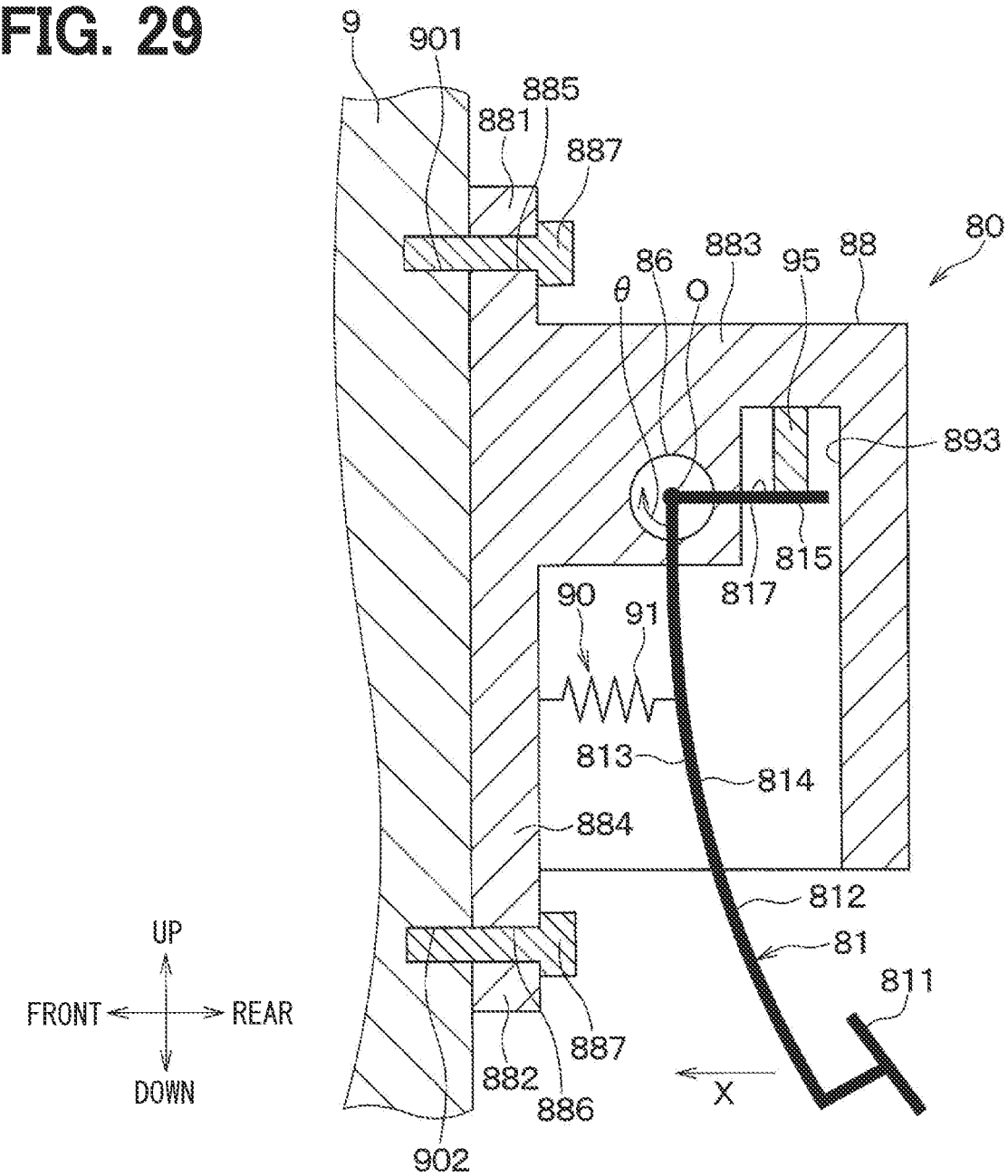
FIG. 29 is a cross-sectional view of a vehicle brake device according to a fifteenth embodiment.

The housing bottom portion 883 of the housing 88 further includes a housing recess 893, as illustrated in FIG. 29. The housing recess 893 is formed on a rear side of the housing bottom portion 883 and is recessed in a vertical direction.

The lever part 812 of the brake pedal 81 has a lever extension portion 815. The lever extension portion 815 is connected to the rotation shaft O and extends rearward from the rotation shaft O, here toward the housing recess 893. Thus, a part of the lever extension portion 815 is housed in the housing recess 893.

The stopper 95 is housed in the housing recess 893 and connected to the housing bottom portion 883. The stopper 95 is in contact with an extension upper surface 817 of the lever extension portion 815. Thus, the stopper 95 stops the lever part 812 so that the brake pedal 81 is inhibited from rotating in the direction opposite to the rotation direction when the brake pedal 81 is stepped on.

Also in the fifteenth embodiment, similar effects to those of the first embodiment are exhibited.

Sixteenth Embodiment

A sixteenth embodiment is different from the fourteenth embodiment in the form of the brake pedal 81 and the arrangement of the stopper 95. Other configurations are similar to those of the fourteenth embodiment.

Figure 30:
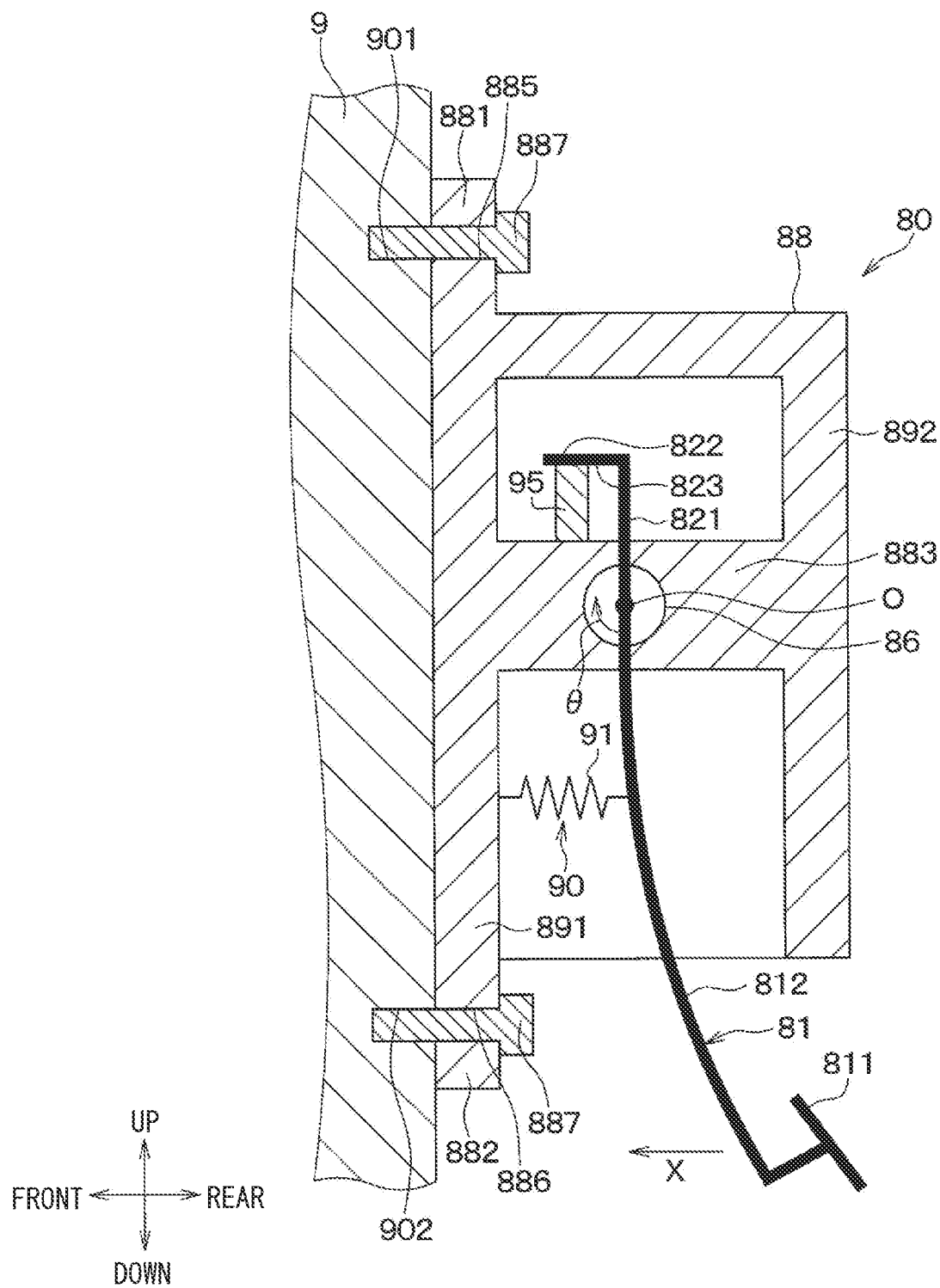
FIG. 30 is a cross-sectional view of a vehicle brake device according to a sixteenth embodiment.

Similarly to the fourteenth embodiment, the housing 88 has, as illustrated in FIG. 30, a first mounting portion 881, a second mounting portion 882, a housing bottom portion 883, a first housing cylindrical portion 891, and a second housing cylindrical portion 892.

The lever part 812 of the brake pedal 81 has a first lever extension portion 821 and a second lever extension portion 822.

As is the lever extension portion 815, the first lever extension portion 821 is connected to the rotation shaft O and extends upward from the rotation shaft O, here, toward the second housing cylindrical portion 892. Thus, the first lever extension portion 821 is housed in the second housing cylindrical portion 892.

The second lever extension portion 822 extends forward from an end portion of the first lever extension portion 821 and is housed in the second housing cylindrical portion 892.

The stopper 95 is housed in the second housing cylindrical portion 892 and is connected to the housing bottom portion 883. The stopper 95 is in contact with an extended lower surface 823 of the second lever extension portion 822. Thus, the stopper 95 stops the lever part 812 so that the brake pedal 81 is inhibited from rotating in the direction opposite to the rotation direction when the brake pedal 81 is stepped on.

Also in the sixteenth embodiment, similar effects to those of the fourteenth embodiment are exhibited.

Seventeenth Embodiment

A seventeenth embodiment is different from the first embodiment in the forms of the housing 88 and the brake pedal 81 and the arrangement of the stopper 95. Other configurations are similar to those of the first embodiment.

Figure 31:
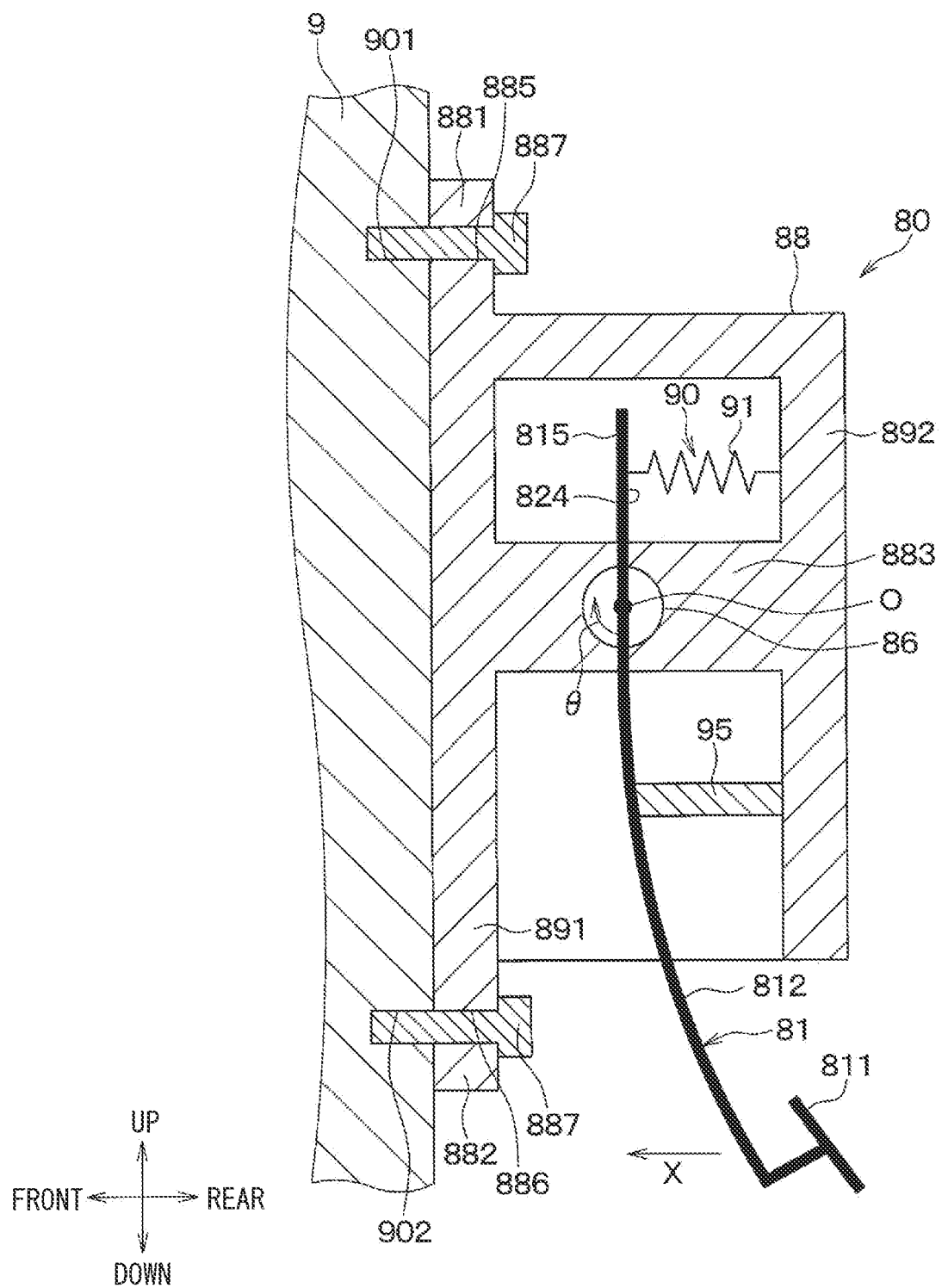
FIG. 31 is a cross-sectional view of a vehicle brake device according to a seventeenth embodiment.

Similarly, the housing 88 has, as illustrated in FIG. 31, a first housing cylindrical portion 891 and a second housing cylindrical portion 892 in addition to the first mounting portion 881, the second mounting portion 882, and the housing bottom portion 883 described above.

The lever part 812 of the brake pedal 81 has a lever extension portion 815 similarly to as described above. The lever extension portion 815 is connected to the rotation shaft O and extends upward from the rotation shaft O, here, toward the second housing cylindrical portion 892.

The elastic member 91 of the reaction force generator 90 is connected to a rear side of the second housing cylindrical portion 892 and an extension rear surface 824 of the lever extension portion 815. Thus, when the brake pedal 81 is operated by a depression force of the driver of the vehicle 6, a force corresponding to the depression force is transmitted from the lever extension portion 815 to the elastic member 91. Consequently, the elastic member 91 is elastically deformed, here contracted, and thus a restoring force is generated. A reaction force Fr against the lever part 812 is generated by this restoring force.

Also in the seventeenth embodiment, similar effects to those of the first embodiment are exhibited.

Eighteenth Embodiment

An eighteenth embodiment is different from the first embodiment in the forms of the housing 88 and the brake pedal 81 and the arrangements of the reaction force generator 90 and the stopper 95. Other configurations are similar to those of the first embodiment.

Figure 32:
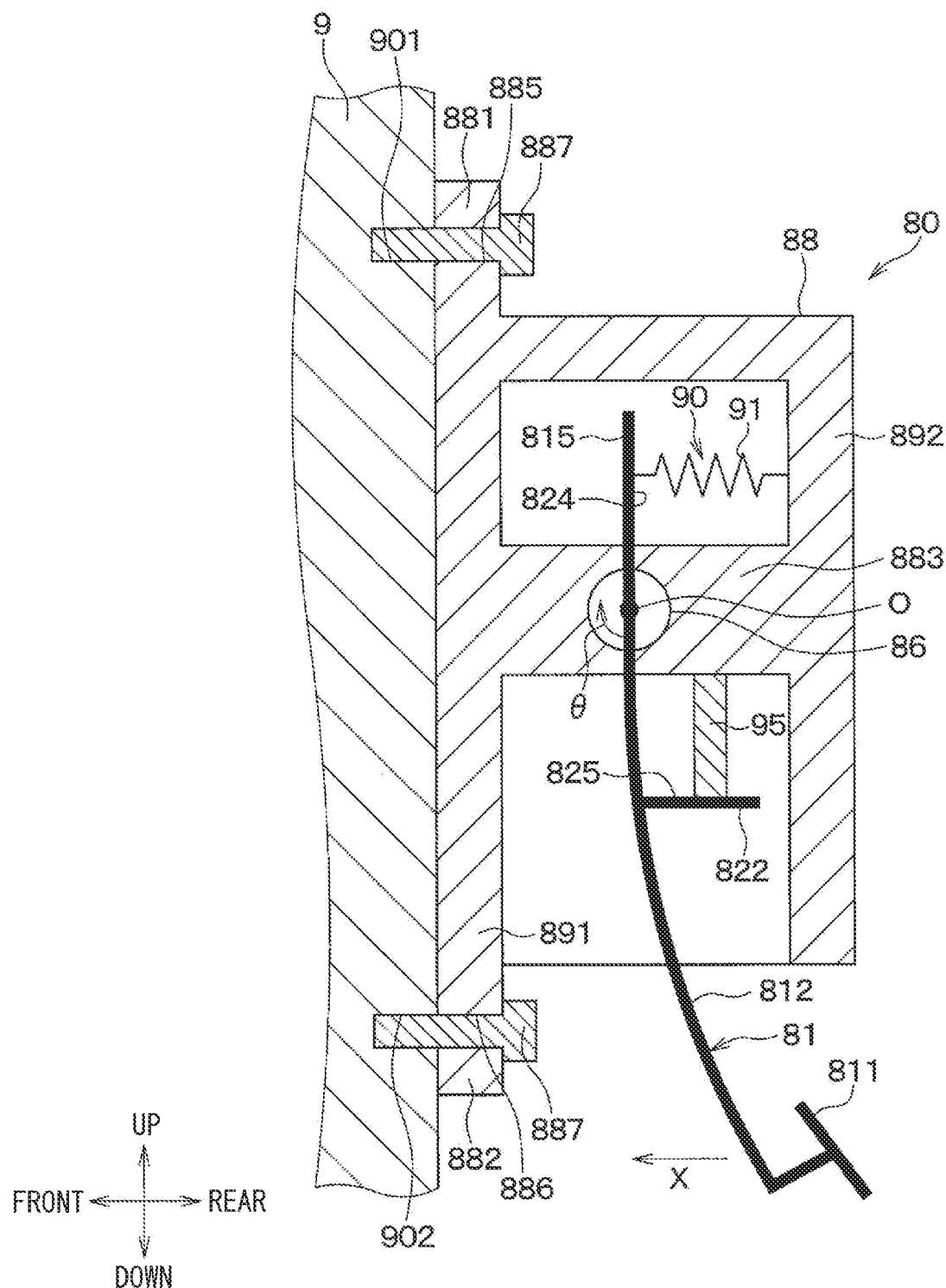
FIG. 32 is a cross-sectional view of a vehicle brake device according to an eighteenth embodiment.

Similarly, the housing 88 has, as illustrated in FIG. 32, a first mounting portion 881, a second mounting portion 882, a housing bottom portion 883, a first housing cylindrical portion 891, and a second housing cylindrical portion 892.

The lever part 812 of the brake pedal 81 has a first lever extension portion 821 and a second lever extension portion 822.

As is the lever extension portion 815, the first lever extension portion 821 is connected to the rotation shaft O and extends upward from the rotation shaft O, here, toward the second housing cylindrical portion 892. Thus, the first lever extension portion 821 is housed in the second housing cylindrical portion 892.

The second lever extension portion 822 is housed in the first housing cylindrical portion 891 and extends rearward from a portion of the lever part 812 housed in the first housing cylindrical portion 891.

The elastic member 91 of the reaction force generator 90 is connected to the rear side of the second housing cylindrical portion 892 and the extension rear surface 824 of the lever extension portion 815. Thus, when the brake pedal 81 is operated by a depression force of the driver of the vehicle 6, a force corresponding to the depression force is transmitted from the lever extension portion 815 to the elastic member 91. Consequently, the elastic member 91 is elastically deformed, here contracted, and thus a restoring force is generated. A reaction force Fr against the lever part 812 is generated by this restoring force.

The stopper 95 is housed in the first housing cylindrical portion 891 and is connected to the housing bottom portion 883. The stopper 95 is in contact with an extension upper surface 825 of the second lever extension portion 822. Thus, the stopper 95 stops the lever part 812 so that the brake pedal 81 is inhibited from rotating in the direction opposite to the rotation direction when the brake pedal 81 is stepped on.

Also in the eighteenth embodiment, similar effects to those of the first embodiment are exhibited.

Nineteenth Embodiment

A nineteenth embodiment is different from the fourteenth embodiment in the arrangement of the reaction force generator 90.

Figure 33:
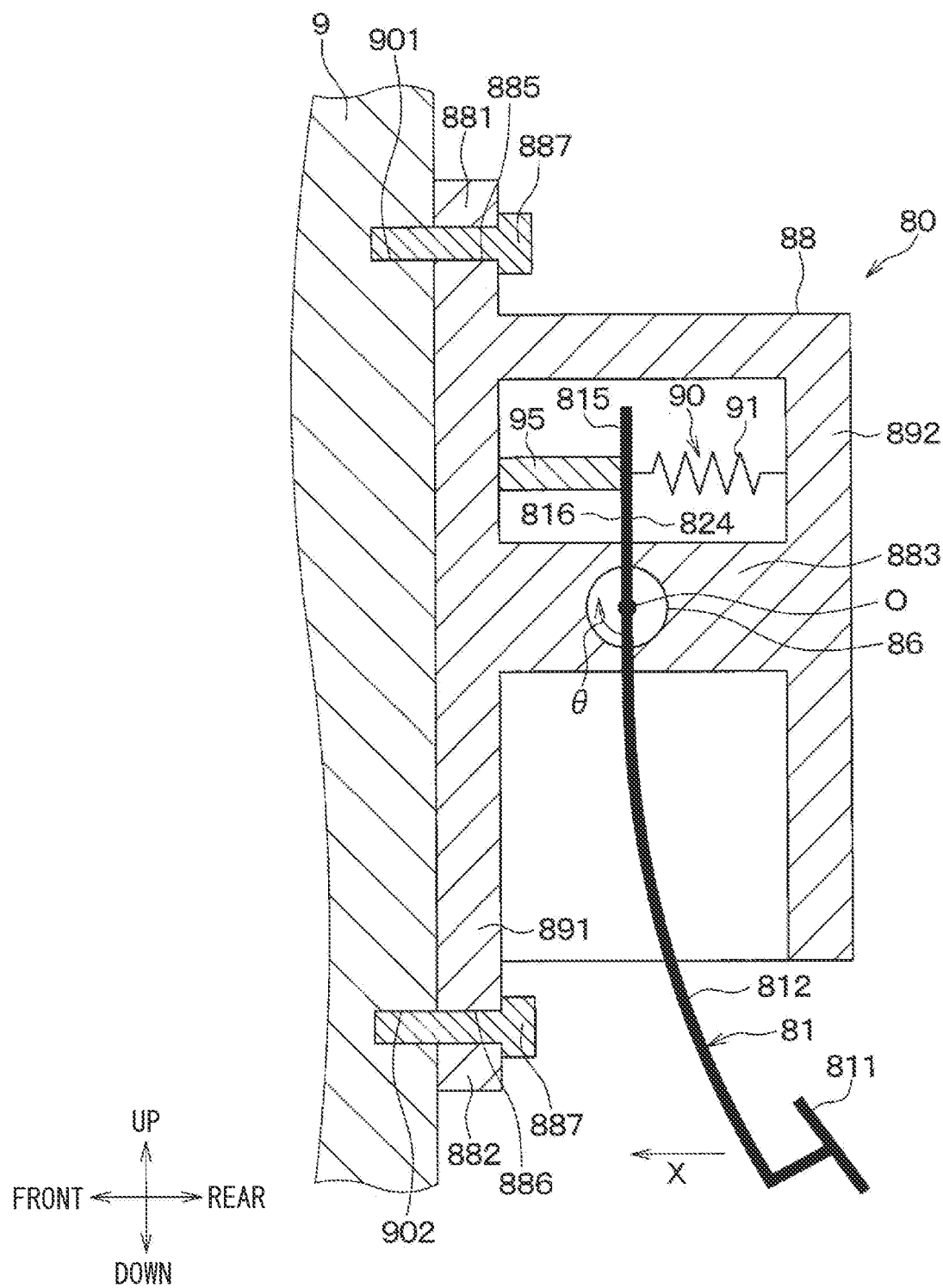
FIG. 33 is a cross-sectional view of a vehicle brake device according to a nineteenth embodiment.

As illustrated in FIG. 33, the elastic member 91 of the reaction force generator 90 is connected to the rear side of the second housing cylindrical portion 892 and the extension rear surface 824 of the lever extension portion 815. Thus, when the brake pedal 81 is operated by a depression force of the driver of the vehicle 6, a force corresponding to the depression force is transmitted from the lever extension portion 815 to the elastic member 91. Consequently, the elastic member 91 is elastically deformed, here contracted, and thus a restoring force is generated. A reaction force Fr against the lever part 812 is generated by this restoring force.

Also in the nineteenth embodiment, similar effects to those of the first embodiment are exhibited.

Twentieth Embodiment

A twentieth embodiment is different from the sixteenth embodiment in the arrangement of the reaction force generator 90.

Figure 34:
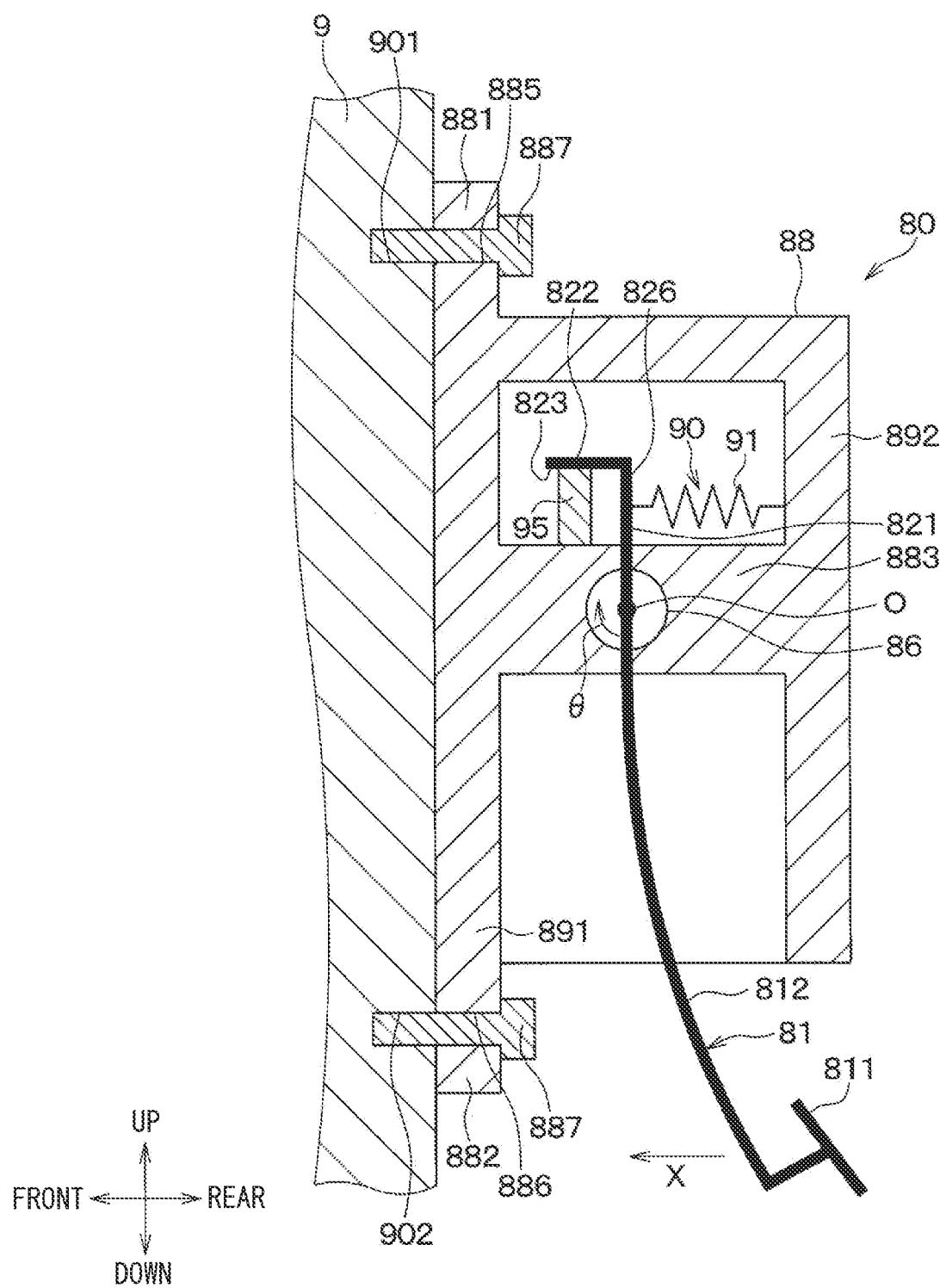
FIG. 34 is a cross-sectional view of a vehicle brake device according to a twentieth embodiment.

As illustrated in FIG. 34, the elastic member 91 of the reaction force generator 90 is connected to the rear side of the second housing cylindrical portion 892 and an extension rear surface 826 of the first lever extension portion 821. Therefore, when the brake pedal 81 is operated by a depression force of the driver of the vehicle 6, a force corresponding to the depression force is transmitted from the first lever extension portion 821 to the elastic member 91. Consequently, the elastic member 91 is elastically deformed, here contracted, and thus a restoring force is generated. A reaction force Fr against the lever part 812 is generated by this restoring force.

Also in the twentieth embodiment, similar effects to those of the first embodiment are exhibited.

Twenty-First Embodiment

In a twenty-first embodiment, the reaction force generator 90 of the vehicle brake device 80 has a damper 94. Other configurations are similar to those of the first embodiment.

Figure 35:
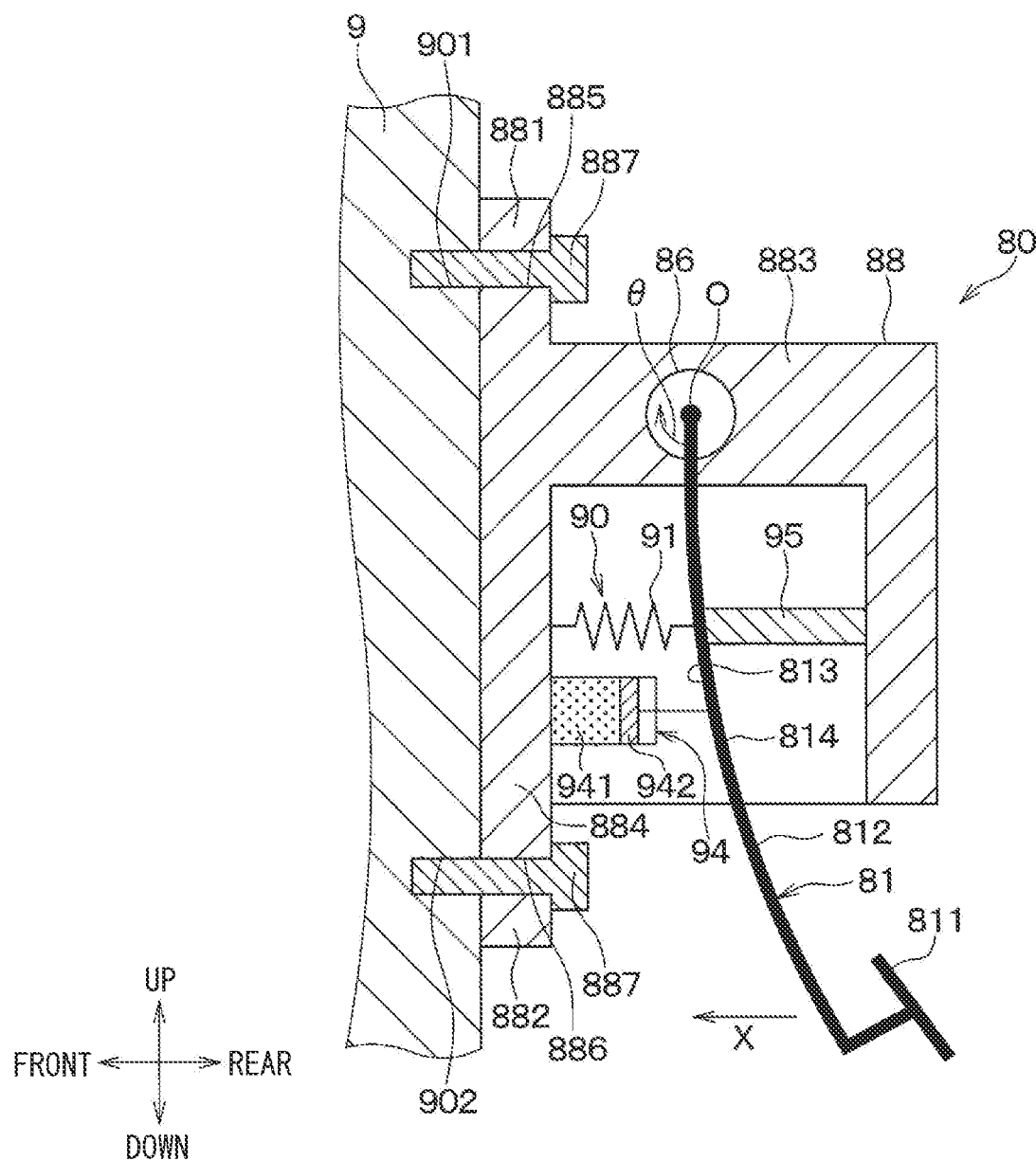
FIG. 35 is a cross-sectional view of a vehicle brake device according to a twenty-first embodiment.

As illustrated in FIG. 35, the reaction force generator 90 of the vehicle brake device 80 of the twenty-first embodiment has the damper 94. The damper 94 generates a reaction force Fr according to a stroke change amount ΔX that is a change amount of the stroke amount X per unit time. Specifically, the damper 94 includes a damper cylinder 941 and a damper piston 942.

The damper cylinder 941 is formed in a bottomed cylindrical shape, and a fluid is sealed in the damper cylinder 941. The fluid is, for example, a viscous fluid such as oil and air. In FIG. 34, in order to clarify the location of the viscous fluid in the damper cylinder 941, the viscous fluid in the damper cylinder 941 is indicated by a dot pattern.

Figure 36:
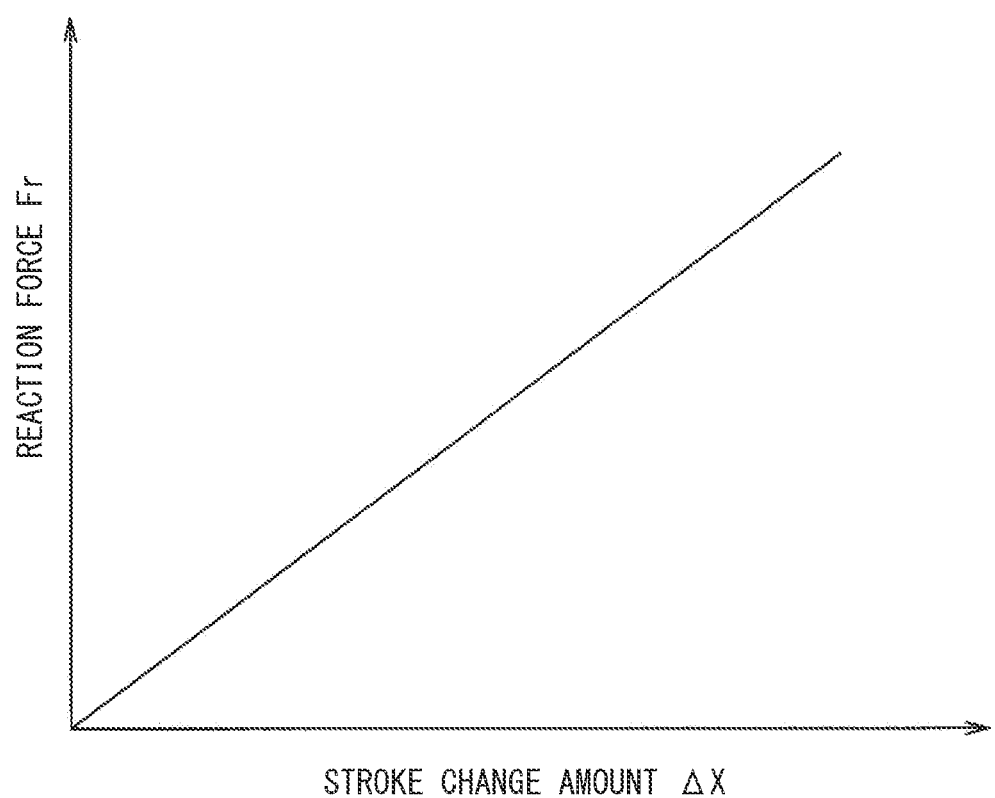
FIG. 36 is a relationship diagram between a stroke change amount and a reaction force.

The damper piston 942 slides in the damper cylinder 941 along an axial direction of the damper cylinder 941. One end of the damper piston 942 is connected to the lever part 812 of the brake pedal 81. Thus, when the brake pedal 81 is operated by a depression force of the driver of the vehicle 6, a force corresponding to the depression force is transmitted from the lever part 812 to the damper piston 942. Thus, the damper piston 942 compresses the fluid sealed in the damper cylinder 941. At this time, the reaction force Fr corresponding to the stroke change amount ΔX is generated by the viscosity of the fluid in the damper cylinder 941. Here, the reaction force Fr due to the fluid is proportional to the stroke change amount ΔX. Therefore, as illustrated in FIG. 36, the stroke change amount ΔX and the reaction force Fr have a linear relationship. Thus, controllability of the reaction force Fr is improved.

Also in the twenty-first embodiment, similar effects to those of the first embodiment are exhibited.

Twenty-Second Embodiment

A twenty-second embodiment is different from the first embodiment in the forms of the housing 88 and the stopper 95 of the vehicle brake device 80. Other configurations are similar to those of the first embodiment.

Figure 37:
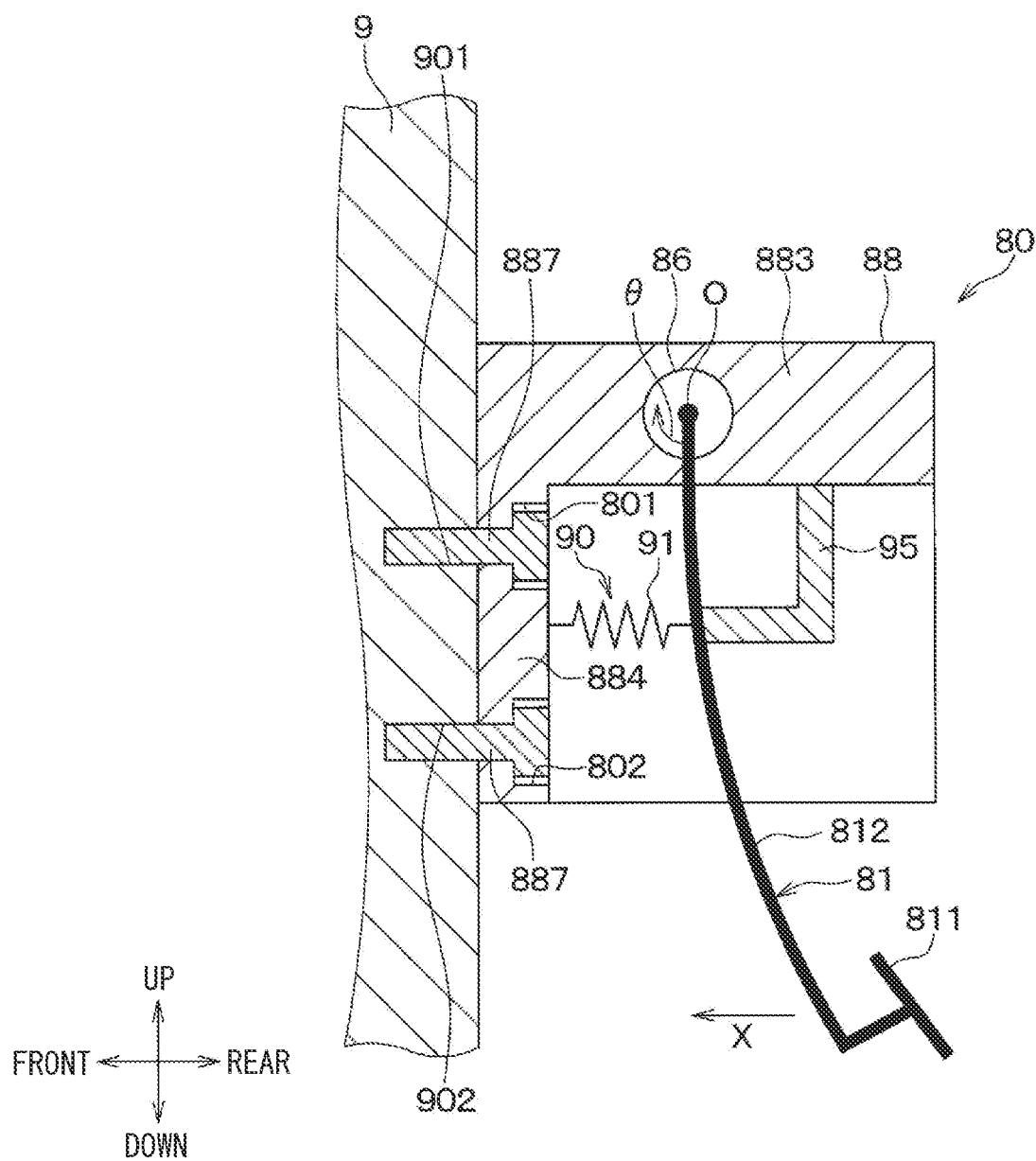
FIG. 37 is a cross-sectional view of a vehicle brake device according to a twenty-second embodiment.

As illustrated in FIG. 37, the housing 88 of the vehicle brake device 80 does not have the first mounting portion 881 and the second mounting portion 882, but has a housing bottom portion 883 and a housing cylindrical portion 884.

Here, a first counterbore hole 801 corresponding to the first hole 901 of the dash panel 9 is formed in a front side of the housing cylindrical portion 884. The housing 88 is attached to the dash panel 9 by inserting the bolt 887 into the first counterbore hole 801 and the first hole 901 of the dash panel 9.

A second counterbore hole 802 corresponding to the second hole 902 of the dash panel 9 is formed in the front side of the housing cylindrical portion 884. The housing 88 is attached to the dash panel 9 by inserting the bolt 887 into the second counterbore hole 802 and the second hole 902 of the dash panel 9.

Here, a portion of the rear side of the housing 88 is not formed in the housing cylindrical portion 884, and thus the housing 88 has an L-shaped cross section by the housing cylindrical portion 884 and the housing bottom portion 883.

The stopper 95 is formed in an L shape and is connected to the housing bottom portion 883. The stopper 95 is in contact with the rear surface 814 of the lever part 812. Thus, the stopper 95 stops the lever part 812 so that the brake pedal 81 is inhibited from rotating in the direction opposite to the rotation direction when the brake pedal 81 is stepped on.

Also in the twenty-second embodiment, similar effects to those of the first embodiment are exhibited.

Twenty-Third Embodiment

A twenty-third embodiment is different from the first embodiment in the form of the stopper 95 of the vehicle brake device 80. Other configurations are similar to those of the first embodiment.

Figure 38:
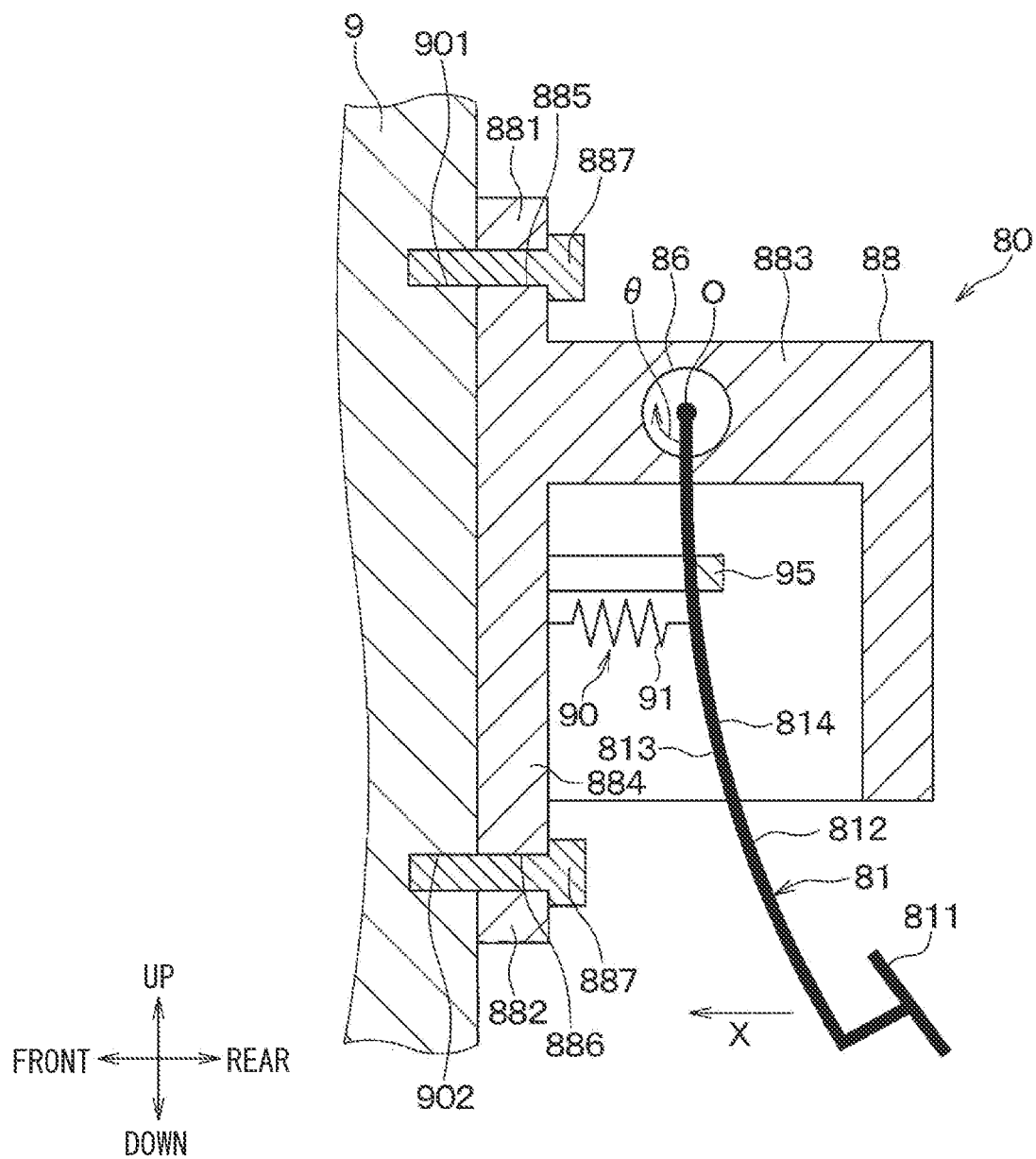
FIG. 38 is a cross-sectional view of a vehicle brake device according to a twenty-third embodiment.

As illustrated in FIG. 38, the stopper 95 is formed in a U shape and is connected to the front side of the housing cylindrical portion 884. The stopper 95 is in contact with the rear surface 814 of the lever part 812 to hook the brake pedal 81. Thus, the stopper 95 stops the lever part 812 so that the brake pedal 81 is inhibited from rotating in the direction opposite to the rotation direction when the brake pedal 81 is stepped on.

Also in the twenty-third embodiment, similar effects to those of the first embodiment are exhibited.

Twenty-Fourth Embodiment

A twenty-fourth embodiment is different from the first embodiment in the arrangement of the elastic member 91 of the vehicle brake device 80. Other configurations are similar to those of the first embodiment.

Figure 39:
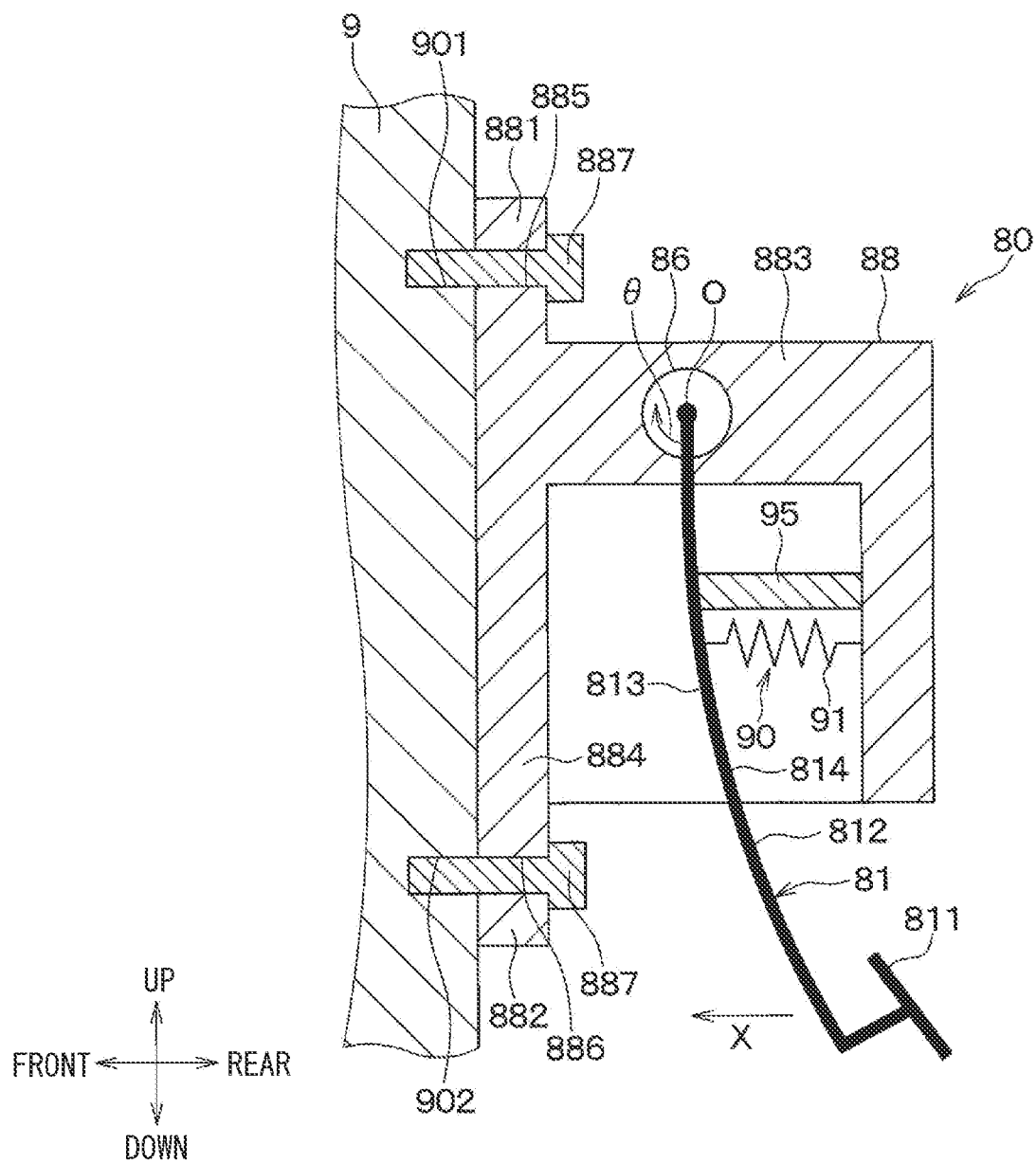
FIG. 39 is a cross-sectional view of a vehicle brake device according to a twenty-fourth embodiment.

As illustrated in FIG. 39, the elastic member 91 of the reaction force generator 90 of the vehicle brake device 80 is connected to the rear surface 814 of the lever part 812 of the brake pedal 81 and the rear side of the housing cylindrical portion 884. At this time, when the brake pedal 81 is operated by a depression force of the driver of the vehicle 6, a force corresponding to the depression force is transmitted from the lever part 812 to the elastic member 91. Consequently, the elastic member 91 extends, so that a restoring force is generated. A reaction force Fr against the lever part 812 is generated by this restoring force.

Also in the twenty-fourth embodiment, similar effects to those of the first embodiment are exhibited.

Twenty-Fifth Embodiment

A twenty-fifth embodiment is similar to the seventeenth embodiment except that the arrangement of the elastic member 91 of the vehicle brake device 80 is different from that of the seventeenth embodiment.

Figure 40:
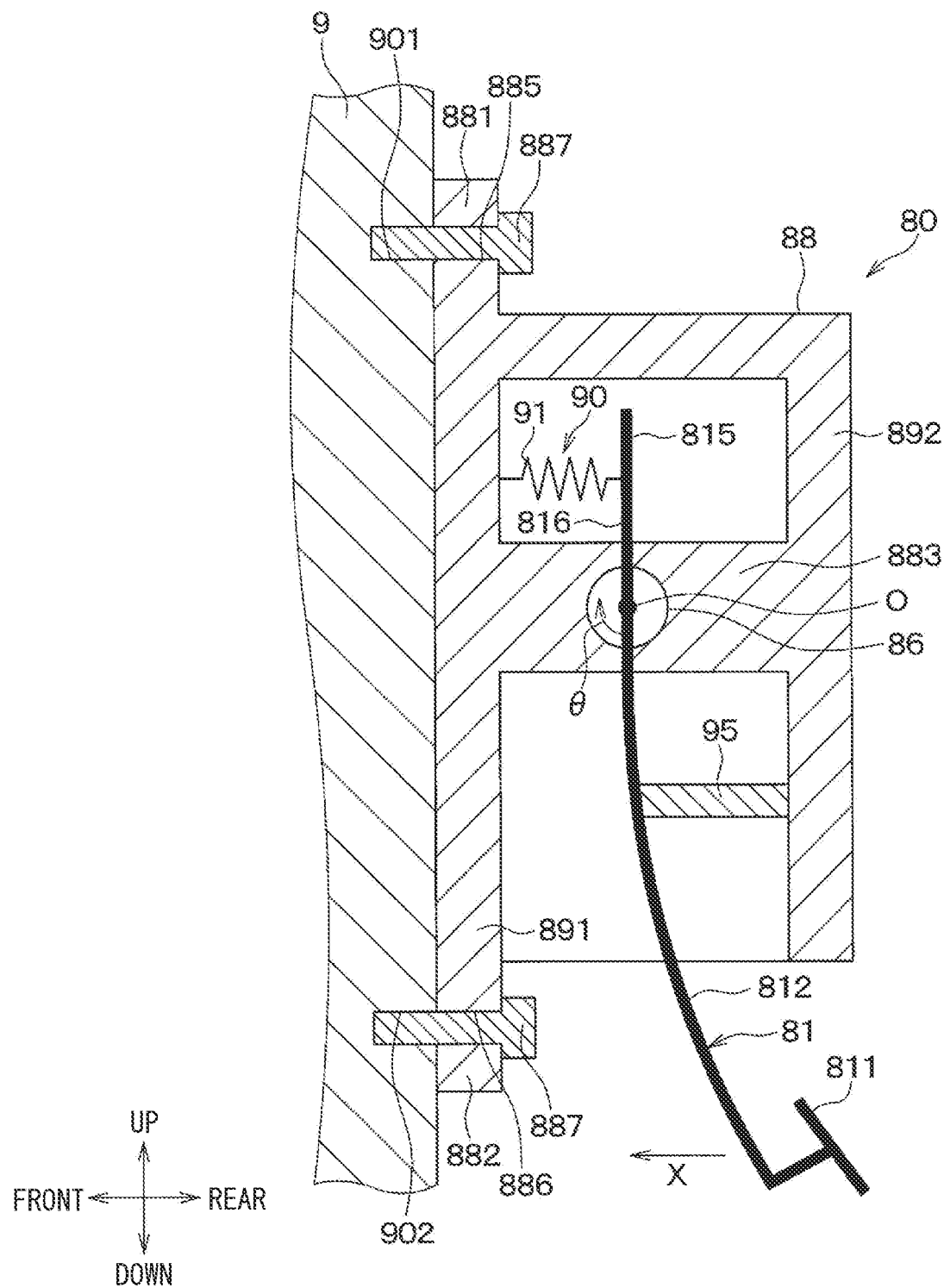
FIG. 40 is a cross-sectional view of a vehicle brake device according to a twenty-fifth embodiment.

As illustrated in FIG. 40, the elastic member 91 of the reaction force generator 90 is connected to the front side of the second housing cylindrical portion 892 and the extension front surface 816 of the lever extension portion 815. Thus, when the brake pedal 81 is operated by a depression force of the driver of the vehicle 6, a force corresponding to the depression force is transmitted from the lever extension portion 815 to the elastic member 91. Consequently, the elastic member 91 is elastically deformed, here stretched, and thus a restoring force is generated. A reaction force Fr against the lever part 812 is generated by this restoring force.

Also in the twenty-fifth embodiment, similar effects to those of the first embodiment and the seventeenth embodiment are exhibited.

Other Embodiments

The present disclosure is not limited to the above embodiments, and can be appropriately modified from the above embodiments. In each of the above embodiments, it goes without saying that the elements constituting the embodiments are not necessarily essential except for a case where it is explicitly stated that the elements are particularly essential and a case where the elements are considered to be obviously essential in principle, and the like.

(1) In the embodiment described above, the vehicle brake device 80 includes the stroke sensor 86. The number of stroke sensors 86 is not limited to one, and may be two or more.

(2) In the embodiment described above, the reaction force generator 90 of the vehicle brake device 80 has the elastic member 91. The number of elastic members is not limited to one, and may be two or more. The reaction force generator 90 of the vehicle brake device 80 has a damper 94. The number of dampers 94 is not limited to one, and may be two or more.

(3) In the embodiment described above, the vehicle brake device 80 includes the sensor power source wire 82, the sensor ground wire 83, the first sensor output wire 841, and the second sensor output wire 842. The number of wires is not limited to one or two, and may be three or more.

(4) The first to twenty-fifth embodiments may be appropriately combined.

What is claimed is:

1. A brake device for a vehicle comprising:
   a brake pedal having a pedal part and a lever part that rotates about a rotation shaft when the pedal part is operated;
   a housing that rotatably supports the lever part;
   a reaction force generator connected to the housing and the lever part to generate a reaction force against the lever part according to a stroke amount of the brake pedal; and
   a stopper configured to stop the lever part by being in contact with the lever part such that the lever part is restricted from rotating in a direction opposite to a rotation direction when the pedal part is operated, wherein
   the reaction force generator has an elastic member that deforms according to the stroke amount, and
   an elastic modulus of the stopper is larger than an elastic modulus of the elastic member.

2. The brake device according to claim 1, further comprising a stroke sensor configured to output a signal corresponding to the stroke amount.

3. The brake device according to claim 1, wherein a change amount of the reaction force with respect to the stroke amount changes as the stroke amount increases.

4. The brake device according to claim 1, wherein a change amount of the reaction force with respect to the stroke amount increases as the stroke amount increases.

5. The brake device according to claim 1, wherein the elastic member is a first elastic member, the brake device further comprises:
   a second elastic member that deforms according to the stroke amount, wherein
   the reaction force is obtained by combining a restoring force due to deformation of the first elastic member and a restoring force due to deformation of the second elastic member.

6. The brake device according to claim 5, wherein
   the first elastic member is connected to the housing and the lever part, and
   the second elastic member is connected to either the housing or the lever part.

7. The brake device according to claim 5, wherein an elastic modulus of the second elastic member is larger than an elastic modulus of the first elastic member.

8. The brake device according to claim 1, wherein
   the housing has a hole into which the stopper is inserted, and
   the stopper moves in the hole of the housing to adjust a position where the stopper and the brake pedal are in contact with each other.

9. The brake device according to claim 1, wherein the stopper is located on a straight line passing through the reaction force generator and along a direction of the reaction force.

10. The brake device according to claim 1, wherein the housing and the stopper are integrated.

11. The brake device according to claim 1, wherein the housing is disposed on a cabin side of a partition wall that separates a cabin of the vehicle from an outer side of the cabin.

* * * * *